United States Patent
Chen et al.

(10) Patent No.: US 10,992,414 B2
(45) Date of Patent: Apr. 27, 2021

(54) ELECTRONIC DEVICE AND METHOD FOR WIRELESS COMMUNICATION SYSTEM

(71) Applicant: Sony Corporation, Tokyo (JP)

(72) Inventors: Wei Chen, Beijing (CN); Xin Guo, Beijing (CN); Jianjun Peng, Beijing (CN); Bo Bai, Beijing (CN)

(73) Assignee: SONY CORPORATION, Tokyo (JP)

( * ) Notice: Subject to any disclaimer, the term of this patent is extended or adjusted under 35 U.S.C. 154(b) by 13 days.

(21) Appl. No.: 16/478,481

(22) PCT Filed: Jan. 22, 2018

(86) PCT No.: PCT/CN2018/073651
§ 371 (c)(1),
(2) Date: Jul. 17, 2019

(87) PCT Pub. No.: WO2018/137582
PCT Pub. Date: Aug. 2, 2018

(65) Prior Publication Data
US 2019/0372710 A1      Dec. 5, 2019

(30) Foreign Application Priority Data
Jan. 24, 2017   (CN) .......................... 201710053390.2

(51) Int. Cl.
*H04L 1/00*         (2006.01)
*H04W 72/04*      (2009.01)
*H04W 88/02*      (2009.01)

(52) U.S. Cl.
CPC ....... *H04L 1/0048* (2013.01); *H04W 72/0446* (2013.01); *H04W 72/0453* (2013.01); *H04W 88/02* (2013.01)

(58) Field of Classification Search
None
See application file for complete search history.

(56) References Cited

U.S. PATENT DOCUMENTS

2015/0282185 A1*  10/2015  Nikopour .............. H04L 1/0015
                                                                    370/329
2016/0204969 A1*  7/2016  Zhu ....................... H04L 1/0004
                                                                    375/261
(Continued)

FOREIGN PATENT DOCUMENTS

| CN | 105263151 A | 1/2016 |
| CN | 105721123 A | 6/2016 |
| CN | 106059968 A | 10/2016 |

OTHER PUBLICATIONS

International Search Report and Written Opinion dated Apr. 16, 2018 for PCT/CN2018/073651 filed on Jan. 22, 2018, 8 pages including English Translation of the International Search Report.

*Primary Examiner* — Saba Tsegaye
(74) *Attorney, Agent, or Firm* — Xsensus LLP

(57) ABSTRACT

The present disclosure relates to an electronic device and a method for a wireless communication system. The electronic device for a wireless communication system comprises a processing circuit, the processing circuit being configured to perform terminal device grouping with respect to data transmissions on the basis of terminal device information, a plurality of data flows of terminal devices within a single group multiplexing resources by means of mode domain multiple access. The processing circuit is further configured to perform at least one of terminal device regrouping, intra group resource redistribution, and data detection scheme updating on the basis of detection information of data transmission, the data detection scheme being used for decoding received data on the basis of a serial detection algorithm.

18 Claims, 20 Drawing Sheets

(56) References Cited

U.S. PATENT DOCUMENTS

2016/0330695 A1 11/2016 Benjebbour et al.
2016/0373901 A1* 12/2016 Urabayashi ............. H04W 4/06
2019/0052309 A1* 2/2019 Schmidt .............. H04W 52/346

* cited by examiner group configuration template 1    group configuration template 2

$$F = \begin{bmatrix} 1 & 0 & 1 & 0 & 1 & 0 \\ 1 & 1 & 0 & 1 & 0 & 1 \\ 0 & 1 & 1 & 0 & 0 & 1 \\ 0 & 0 & 0 & 1 & 1 & 0 \end{bmatrix}$$

before re-allocating resources within group $$F = \begin{bmatrix} 1 & 0 & 1 & 0 & 1 & 0 \\ 1 & 0 & 0 & 1 & 0 & 1 \\ 0 & 1 & 1 & 0 & 0 & 1 \\ 0 & 1 & 0 & 1 & 1 & 0 \end{bmatrix}$$

after re-allocating resources within group

ELECTRONIC DEVICE AND METHOD FOR WIRELESS COMMUNICATION SYSTEM

CROSS-REFERENCE TO RELATED APPLICATIONS

The present application is based on PCT filing PCT/CN2018/073651, filed Jan. 22, 2018, which claims priority to CN 201710053390.2, filed Jan. 24, 2017, the entire contents of each are incorporated herein by reference.

TECHNICAL FIELD

The present disclosure relates generally to electronic devices and methods for wireless communication systems, in particular to electronic devices and methods for resource multiplexing by multiple access in mode domain.

BACKGROUND

With large-scale application of wireless communication technologies and rapid development of wireless communication services, there exists an increasing requirement for throughput and peak rate of wireless communication systems, in order to meet evolving user demands. In order to improve spectrum efficiency of a wireless communication system and increase a number of terminal devices having access to the wireless communication system, various new types of multiple access methods have been proposed. Among the new multiple access methods, one is Sparse Code Multiple Access (SCMA) technology. In SCMA, data for one or more terminal devices are mapped to constellation and spread in code domain, making binary symbols mapped to codewords in a multi-dimensional sparse codebook, such that the data for the one or more terminal devices can be transmitted in same time-frequency resources; accordingly, data received at a receiving end which are superimposed in the same time-frequency resources are detected by using a detection algorithm, such that data for respective terminal devices are separated. Among the new multiple access methods, one is Pattern Division Multiple Access (PDMA) technology. In PDMA, data for one or more terminal devices are mapped to resource groups through patterns, such that the data for the one or more terminal devices can be transmitted in the same resource group; accordingly, data received at a receiving end which are superimposed in the same resource group are detected by using a detection algorithm, such that data for respective terminal devices are separated.

SUMMARY

A summary of the disclosure is set forth below to provide a basic understanding of some aspects of the disclosure. However, it should be understood that this summary is not an exhaustive overview of the disclosure. It is not intended to identify key or critical parts of the disclosure, and not to limit the scope of the disclosure. Its purpose is to present some of the concepts of the present disclosure in a simplified form, as a prelude to a more detailed description given later.

According to an aspect of the present disclosure, an electronic device for a wireless communication system is provided which comprises a processing circuit. The processing circuit is configured to group terminal devices for data transmission based on terminal device information, wherein resources are multiplexed by a plurality of data streams for terminal devices in a same group through multiple access in mode domain. The processing circuit is further configured to, based on detection information on the data transmission, perform at least one of: re-grouping the terminal devices, re-allocating resources within respective groups, and updating data detection scheme, wherein the data detection scheme is used for decoding received data based on serial detection algorithms.

According to another aspect of the present disclosure, an electronic device for a wireless communication system is provided which comprises a processing circuit. The processing circuit is configured to obtain results of terminal device grouping, the results of the terminal device grouping is determined for data transmission based on terminal device information, wherein resources are multiplexed by a plurality of data streams for the terminal devices in a same group through multiple access in mode domain. The processing circuit is further configured to obtain at least one of results of terminal device re-grouping, results of resource re-allocation, and an updated data detection scheme, wherein the at least one of results of the terminal device re-grouping, results of the resource re-allocation, and the updated data detection scheme is determined based on detection information on the data transmission, wherein the data detection scheme is used for decoding received data by the electronic device based on serial detection algorithms.

According to another aspect of the present disclosure, a method for communication is provided. The method comprises grouping terminal devices for data transmission based on terminal device information, wherein resources are multiplexed by a plurality of data streams for terminal devices in a same group through multiple access in mode domain. The method further comprises, based on detection information on the data transmission, performing at least one of: re-grouping the terminal devices, re-allocating resources within respective groups, and updating data detection scheme, wherein the data detection scheme is used for decoding received data based on serial detection algorithms.

According to another aspect of the present disclosure, a method for communication is provided. The method comprises obtaining results of terminal device grouping, the results of the terminal device grouping is determined for data transmission based on terminal device information, wherein resources are multiplexed by a plurality of data streams for the terminal devices in a same group through multiple access in mode domain. The method further comprises obtaining at least one of results of terminal device re-grouping, results of resource re-allocation, and an updated data detection scheme, wherein the at least one of results of the terminal device re-grouping, results of the resource re-allocation, and the updated data detection scheme is determined based on detection information on the data transmission, wherein the data detection scheme is used for decoding received data based on serial detection algorithms.

According to another aspect of the present disclosure, an electronic device for a wireless communication system is provided which comprises a serial detection receiver. The serial detection receiver is configured to comprise parallel detection units of at least two levels, for decoding level by level the received signals transmitted through multiple access in mode domain, wherein each level of the parallel detection unit can support parallel data detection for a plurality of terminal devices, and wherein the decoding output from a parallel detection unit in a front level is used as a known interference in a parallel detection unit in a subsequent level, in order to be removed from the received signals transmitted through the multiple access in mode domain, and orthogonality among resources of target data streams in the parallel detection unit in the front level is better than orthogonality among resources of target data streams in the parallel detection unit in the subsequent level.

Another aspect of the present disclosure further provides a computer-readable storage medium storing one or more instructions that, when executed by one or more processors of an electronic device, cause the electronic device to perform the method of the present disclosure.

DESCRIPTION OF THE DRAWINGS

A better understanding of the present disclosure can be achieved by referring to the detailed description given hereinafter in connection with the accompanying drawings, wherein same or similar reference signs are used to indicate same or similar components throughout the figures. The figures are included in the specification and form a part of the specification along with the following detailed descriptions, for further illustrating embodiments herein and explaining the theory and advantages of the present disclosure. Wherein.

DESCRIPTION OF EMBODIMENTS

Figure 1A:
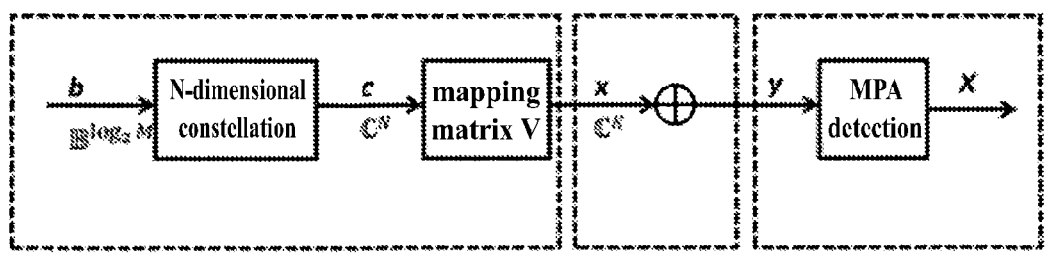
FIGS. 1A-1C illustrate an exemplary communication system which multiplexes transmission resources by multiple access in mode domain in accordance with an embodiment herein.

Hereinafter, embodiments of the present disclosure will be described in detail with reference to the accompanying drawings. It is to be noted that, in the specification and the drawings, structural elements that have substantially the same function and structure are denoted by the same reference numerals, and repeated description of these structural elements is omitted.

Exemplary embodiments herein will be described hereinafter with reference to the accompanying drawings. For the sake of clarity and conciseness, not all features of actual implementation are described in the specification. However, it should be appreciated that implementation specific decisions must be made in the development of any such actual embodiment, so as to achieve specific goals of the developer. For example, to comply with constrain conditions related to system and business, and these constrain conditions may vary from implementation to implementation. Furthermore, it will also be appreciated that the development work may be more complicated and time consuming, although such development work is merely a routine task for those skilled in the art having benefit of this disclosure.

It is to be noted that, only the device structure and/or operational steps closely related to the solutions according to the present disclosure are shown in the drawings in order to avoid obscuring the present disclosure with unnecessary detail, and other details that has little relation to the present disclosure are omitted.

There is communication method for multiplexing resources by multiple access in mode domain, wherein "mode" defines how a plurality of resources are occupied by data for a plurality of terminal devices. For example, a certain form of coding can be used to embody the mode of resource occupancy by the data of the terminal devices. In the present disclosure, "data for a terminal device" or "data stream for a terminal device" refers to a data or data stream transmitted from or to a terminal device. In other words, "data for the terminal device" or "data stream for the terminal device" includes, in some examples, data or data stream transmitted from the terminal device to a base station in uplink data transmission, and in other examples, includes data or data stream transmitted from the base station to the terminal device in downlink data transmission. Examples of the multiple access in mode domain can include foregoing SCMA and PDMA, which respectively define the resources occupancy by the data for the plurality of terminal devices by using a multi-dimensional sparse codebook or a feature pattern as modes, thereby distinguishing data for each terminal device. In the present disclosure, multiple access in mode domain is distinct from power domain multiple access in which data for the terminal devices are distinguished by power characteristics. For example, in SCMA, a sparse codebook can be designed to indicate whether the data for the terminal device occupies a certain resource by 1, 0. In PDMA, different patterns can be designed for each terminal device to distinguish the occupancy of resources. In the context of the present disclosure, resources generally refer to time domain and frequency domain resources. Those skilled in the art would appreciate that resources can also include additional resources, such as space domain resources and code domain resources.

In the multiple access in mode domain, data streams for a plurality of terminal devices can be detected or decoded by a parallel detection algorithm. In the parallel detection algorithm, the data streams for all the terminal devices can be simultaneously decoded in an iterative manner. In other words, detection or decoding of data stream for a terminal device by the parallel detection algorithm does not necessarily depend on results of detection or decoding of data stream for another terminal device. Examples of the parallel detection algorithm include, for example, a Maximum A Posteriori (MAP) detection algorithm, a Maximum Likelihood (ML) detection algorithm, and a Message Passing Algorithm (MPA) detection algorithm. The parallel detection algorithm can obtain better detection performance with higher detection complexity. It can be understood that the complexity of the parallel detection algorithm is related to the number of resources and the number of terminal devices in the system. The larger the number of resources and the number of terminal devices is, the higher the detection complexity is.

In the multiple access in mode domain, data streams for a plurality of terminal devices can also be detected or decoded by a serial detection algorithm. In the serial detection algorithm, the data stream for each terminal device can be decoded one by one in a certain order. Detection or decoding of the data stream for a terminal device by the serial detection algorithm depends on results of detection or decoding of the data stream for a preceding terminal device. Examples of the serial detection algorithm include, for example, a Successive Interference Cancellation (SIC) detection algorithm. Compared with the parallel detection algorithm, detection complexity of the serial detection algorithm is low, with the cost of lossy detection performance.

Figure 1B:
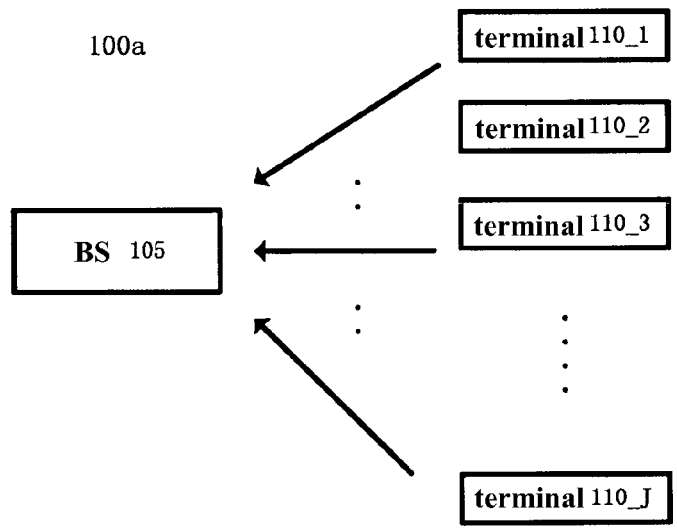
Figure 1C:
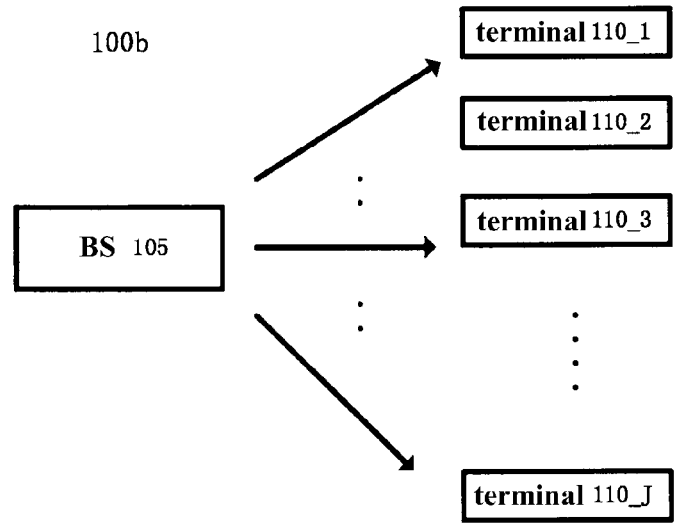

A typical application scenario for the multiple access in mode domain is in cellular mobile communication system. FIG. 1A-C illustrate an exemplary communication system which multiplexes transmission resources by multiple access in mode domain in accordance with an embodiment herein. In the following, the mode domain multiple access system of FIGS. 1A-IC is described in the context of SCMA, it is clear to those skilled in the art that the mode domain multiple access system can adopt any type of the mode domain multiple access technologies (e.g. PDMA).

FIG. 1A illustrates exemplary operations at a transmitting (TX) end and at a receiving (RX) end in an SCMA system. In this example, it is assumed the number of time-frequency resources in the system is K, the number of terminal devices is J, and the number of resources required by each terminal device is N. As shown in FIG. 1A, at the TX end, binary bit information (e.g., $b \in \mathbb{B}^{log_2 M}$, where M is the number of symbol points in the constellation) is first modulated into an N-dimensional constellation symbol (e.g., $e \in \mathbb{C}^N$) by an encoding operation, and the N-dimensional constellation symbol is converted into a sparse K-dimensional code word by a mapping matrix V (e.g., $x \in \mathbb{C}^K (N<K)$). The mapping matrix for the plurality of terminal devices can generally be represented as a factor graph, FIG. 6 below describes a system factor graph F for a case where K=4, J=6, N=2, wherein each row in the factor graph F corresponds to one resource node, each column corresponds to one terminal device, the element of the i-th row, the j-th column being 1 indicates that the corresponding constellation point of the terminal device j occupies the resource i, and the element of the i-th row, the j-th column being 0 indicates that the terminal device j does not occupy the resource i. Then, signals of J terminal devices are multiplexed and transmitted to the TX end. At the TX end, for the received signal (e.g, signal y), data for the terminal devices can be detected by using, for example, an MPA algorithm, based on channel state information, the factor graph F, and the constellation for the terminal devices and by using sparsity of the transmitted signal, that is, signal $X=(x_1, \ldots, x_J)$ for the terminal device can be detected.

The SCMA system 100a in FIG. 1B corresponds to an uplink transmission scenario. As shown in FIG. 1B, the SCMA system 100a comprises a base station (BS) 105 and terminal devices (terminals) 110-1 to 110-J, and the terminal devices 110-1 to 110-J transmit data to the base station 105 by multiplexing time-frequency transmission resources in uplink.

For SCMA in uplink, any of the terminal devices 110-1 to 110-J maps binary data into constellation symbols based on the respective constellation map and mapping matrix V, and obtains a sparse codeword by using the mapping matrix V. The signals for the plurality of terminal devices are multiplexed over the wireless channel and transmitted to the base station 105, the base station 105 decodes data for different terminal devices by using the parallel detection algorithm after receiving the multiplexed signals. In the SCMA system, for example, the message passing algorithm (MPA) can be used as the parallel detection algorithm. In the MPA algorithm, the base station 105 detects data for each terminal device multiplexed on the time-frequency resources by utilizing the sparsity of the received signal. In particular, after receiving the multiplexed signals, the base station 105 establishes a factor graph model F based on the mapping matrix V of terminal devices 110-1 to 110-J, and each terminal device serves as a variable node, each time-frequency resource serves as a factor node. Accordingly, a terminal device occupying a time-frequency resource is represented by a line between a variable node corresponding to the terminal device and a factor node corresponding to the time-frequency resource. Then, based on the constellation of each terminal device 110-1 to 110-J, a possible value of each variable node (i.e., the constellation symbol the terminal device may use when transmitting data) and a probability of each possible value are determined (the initial probability of each possible value can be set to equal to each other). Iterative processes are then performed, and in each iterative process, the variable node sends a prior probability of its possible value to each factor node connected to it by a line. After collecting the information sent by the variable node, the factor node calculates the posterior probability based on the received information and sends it to the variable node. The convergence condition for iteration is that the number of iterations is reached or the difference between information sent by the variable nodes during two iterations is less than a set threshold. After this convergence, the constellation point symbols transmitted by each terminal devices 110-1 to 110-J can be decoded. Based on the constellation of each terminal devices 110-1 to 110-J, the binary data transmitted by each terminal device can be demodulated.

Although sparsity of signals in the SCMA system can enable the MPA algorithm to implement detection for the plurality of terminal devices (i.e., detecting signals for each of terminal devices) with low complexity, in the case where there are a large number of terminal devices (e.g., in the scenario of IoT and the like in future communication), the complicated detection in uplink is still a large computational burden for the base station. For an SCMA system, the detection complexity at each resource factor node is proportional to $M^{d_f}$, where M is the number of constellation points in the constellation and $d_f$ is a maximum number of terminal devices overlapping on a single resource factor node, which is determined by the mapping matrix. The detection complexity on all resource factor nodes is proportional to $K \cdot M^{d_f}$. As indicated above. K is the number of resource factor nodes (i.e., the number of time-frequency resources).

The SCMA system 100b in FIG. 1C corresponds to a downlink transmission scenario. As shown in FIG. 1C, the SCMA system 100b comprises a base station 105 and terminal devices 110-1 to 110-J similarly to FIG. 1B, the base station 105 multiplexes time-frequency transmission resources and transmits data to the terminal devices 110-1 to 110-J in downlink.

For downlink SCMA, the base station 105 maps the binary data of any of terminal devices 110-1 to 110-J to constellation symbols, then obtains a sparse codeword by the mapping matrix V. The signals of the plurality of terminal devices are multiplexed and transmitted to the respective terminal devices. Different from uplink SCMA, the data for the terminal device itself is decoded by using the parallel detection algorithm by each terminal device 110-1 to 110-J after receiving the signals multiplexed by the base station 105. For example, the terminal device can decode the data for the terminal device itself on the multiplexed time-frequency resource by using the MPA algorithm and utilizing sparsity of the received signals. The process performed by each terminal device 110-1 to 110-J by using the MPA algorithm is similar to the process performed by the base station 105 in uplink SCMA, the description thereof is not repeated here.

It is to be noted, since the MPA algorithm is performed by each terminal device in downlink SCMA, considering processing capability of the terminal device is weaker than that of the base station, the higher complexity of the algorithm has a greater impact on the terminal device. In downlink SCMA, the detection complexity is still proportional to $K \cdot M^{d_f}$.

Although FIG. 1A to FIG. 1C are described in the context of SCMA, it would be clear to those skilled in the art that similar process can be performed when other multiple access in mode domain, such as PDMA, is applied. For example, for PDMA, a pattern matrix is used instead of the above-described mapping matrix for encoding at the TX end and decoding/detection at the RX end, the rest of the process is similar to the case of SCMA. In this case, the complexity of the parallel detection algorithm is similarly related to one or more of the number of system resources, the number of terminal devices overlapping on a single resource, and the number of constellation points in the constellation.

Figure 2:
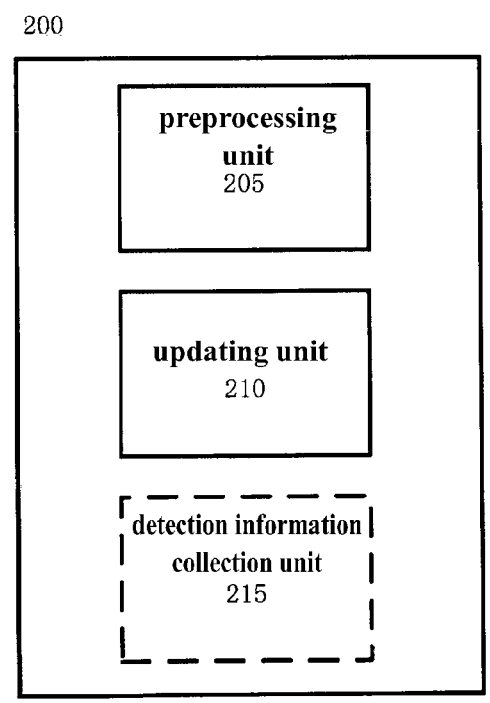
FIG. 2 illustrates an exemplary electronic device for a wireless communication system in accordance with an embodiment herein.

An exemplary electronic device for a wireless communication system in accordance with an embodiment herein is described with reference to FIG. 2. According to an embodiment, the electronic device 200 in FIG. 2 can be, for example, the base station 105 in FIG. 1A or FIG. 1B or can be part of the base station 105, or can be a device (for example, a base station controller) for controlling a base station, or a device used for the base station or a part thereof. As shown in FIG. 2, in an embodiment, the electronic device 200 can comprise a preprocessing unit 205 and an updating unit 210. In a further embodiment, the electronic device 200 can further comprise a detection information collection unit 215. The operations performed by the respective units of the electronic device 200 are described below.

The preprocessing unit 205 can, for example, be configured to group terminal devices for data transmission based on terminal device information, wherein resources are multiplexed by a plurality of data streams for terminal devices in a same group through multiple access in mode domain. In an example, the terminal devices 110-1 to 110-J in FIGS. 1A and 1B can be classified into G groups, and the total transmission resources of the system can be allocated to the respective groups, accordingly. In this example, resources can be multiplexed by the data streams for the terminal devices within each group by a mode domain multiple access technique such as SCMA, resources for different groups are orthogonal. Due to this orthogonality between groups, data detection can be performed only within each group. As explained above, the complexity of parallel detection algorithms (such as MPA) is related to the number of transmission resources. In this example, since the transmission resources allocated to each terminal device group are reduced, the complexity of the parallel detection algorithm (e.g., MPA) can be reduced to some extent.

The updating unit 210 can be configured to, for example, based on detection information on the data transmission, perform at least one of re-grouping the terminal devices, re-allocating resources within respective groups, and updating data detection scheme. For example, in a case where detection performance of the data transmission indicated by the detection information is not ideal, the updating unit 210 can adjust the existing G groups of the terminal devices or adjust the resource allocation within any single group, or update the data detection scheme, or perform any combinations thereof, to improve the detection performance of data transmission. In an embodiment, the data detection scheme can be based on a serial detection algorithm and be used to decode the received data based on the serial detection algorithm. As explained above, the parallel detection algorithm (e.g., MPA) decodes the data for all terminal devices simultaneously in an iterative manner, and the detection complexity is high. In contrast, the data detection scheme based on the serial detection algorithm (or the serial detection algorithm-based data detection scheme) according to the embodiment herein has a lower complexity. In the embodiment herein, "based on serial detection algorithm" is not limited to just using a serial detection algorithm, but means that the data detection scheme adopts at least the idea of serial detection, that is, the detection process can be combination of serial detection operations and parallel detection operations.

As explained above, the electronic device 200 can further comprise a detection information collection unit 215. The detection information collection unit 215 can be configured, for example, to collect detection information on uplink and downlink data transmission, such as detection error information, detection complexity information, and the like, for the updating unit 210 to perform at least one of re-grouping the terminal devices, re-allocating resources within respective groups, and updating data detection scheme. The electronic device 200 can alternatively not comprise the detection information collection unit 215, corresponding operations can be performed by other units (such as the updating unit 210). In an embodiment, by collecting the detection information on uplink and downlink data transmissions, the detection information collection unit 215 can be configured to generate detection information for a specific terminal device (e.g., detection error information for the terminal device), detection information for a specific group (e.g., average detection error information for terminal devices within the group) and detection information for the entire system (e.g., average detection error information for terminal devices of the whole system).

It is to be noted that the electronic device 200 can be used for at least one of uplink data transmission or downlink data transmission. In an example, the electronic device 200 can be the base station 105 or part of the base station 105. For example, in uplink transmission, at least one of grouping or updating operation of the electronic device 200 can be used for detection/decoding at the base station end, and in downlink transmission, at least one of grouping or updating operation of the electronic device 200 can be used for detection/decoding at the terminal end. According to some embodiments, in uplink data transmissions, the detection information collection unit 215 can collect the detection information directly from the base station 105; in downlink data transmissions, the detection information collection unit 215 can collect the detection information from each of the terminal devices 110-1 to 110-J. Accordingly, the respective detection information can be reported by each of the terminal devices 110-1 to 110-3.

In an example, in addition to grouping the terminal devices, the preprocessing unit 205 can determine initial resource allocation and determine an initial data detection scheme, as will be described in detail later with reference to FIGS. 5A-6.

One or more of the preprocessing unit 205, updating unit 210, and detection information collection unit 215 can be implemented, for example, in a processing circuit. Here, a processing circuit can refer to various implementations of digital circuitry, analog circuitry, or mixed signal (combination of analog and digital) circuitry that perform functions in a computing system. The processing circuits can include, for example, circuits such as integrated circuits (ICs), ASICs (application specific integrated circuits), portions or circuits of individual processor cores, entire processor cores, separate processors, programmable hardware devices such as field programmable gate arrays (FPGAs), and/or a system including multiple processors.

It is to be noted that the electronic device 200 can be implemented at the chip level or can be implemented at the device level by including other external components. For example, the electronic device 200 can alone operate as a communication device.

It is to be noted that the various elements described above are merely logical functional blocks that are divided according to the specific functions they achieve, and are not intended to limit the particular implementation. In implementation, each of the above functional units can be implemented as separate physical entities, or can be implemented as a single entity (e.g., a processor (CPU or DSP, etc.), an integrated circuit, etc.).

Specific exemplary operations performed by the electronic device 200 and its various units are described in detail below with reference to FIGS. 3A-9.

Exemplary operations of grouping terminal devices are first described with reference to FIGS. 3A-4B. In an embodiment, the terminal device information can include channel state information including, for example, channel gains.

Grouping the terminal devices as performed by the preprocessing unit 205 can comprise classifying the terminal devices (e.g., the terminal devices 110-1 to 110-J in FIGS. 1A and 1B) into groups based on the channel state information. According to an embodiment, the terminal devices are classified into groups based on the channel state information such that differences between channel gains of the terminal devices in a same group are as large as possible or larger than a predetermined threshold. The threshold herein can be a predetermined value, or can be a certain degree of channel gain difference objectively embodied by an algorithm. In other words, as long as an algorithm for grouping objectively causes its resulted channel gain difference to be greater than the channel gain difference caused by a random grouping, the algorithm for grouping is considered to make the channel gain difference greater than a predetermined threshold.

Figure 3A:
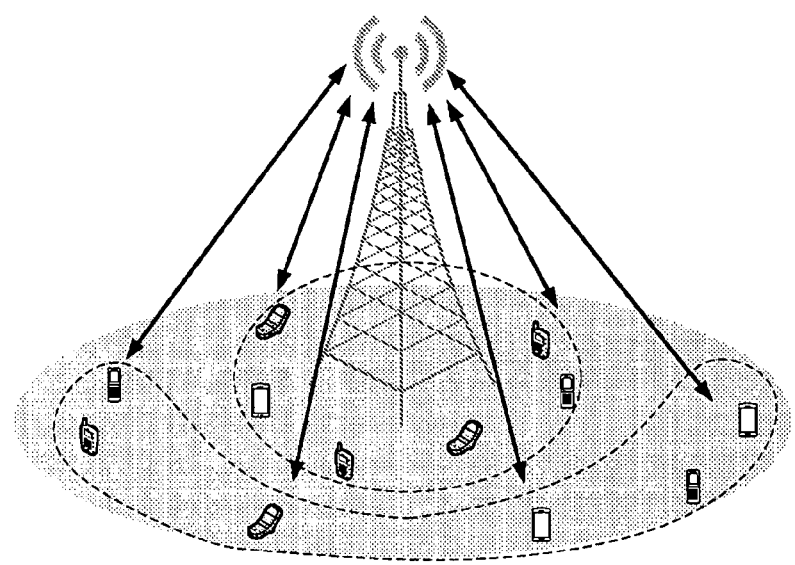
FIG. 3A illustrates a method used for grouping terminal devices.
Figure 3B:
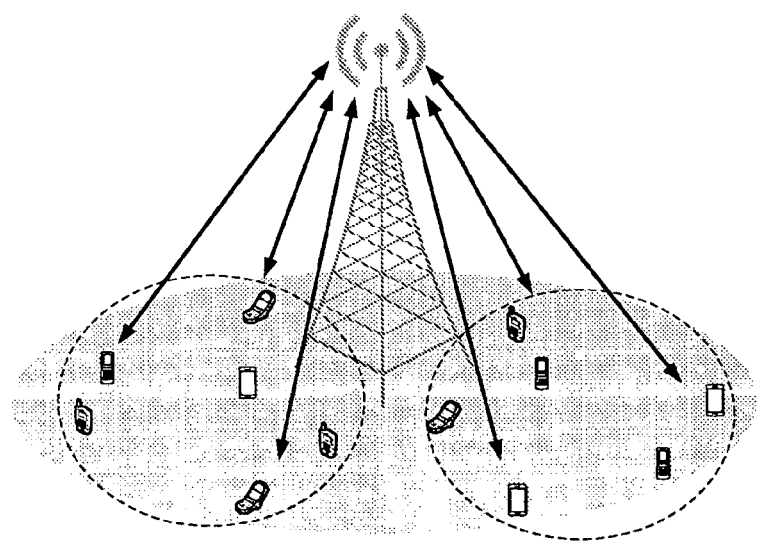
FIG. 3B illustrates an exemplar) method for grouping terminal devices in accordance with an embodiment herein.

FIG. 3A illustrates a method used for grouping terminal devices. In FIG. 3A, the grouping method used in the mode domain multiple access system makes the channel gains of the terminal devices within a same group as close as possible, such that the terminal devices from different groups generally have larger channel gain differences, and the terminal devices within the same group have smaller channel gain differences. As shown in FIG. 3A, 6 terminal devices close to the base station and having larger channel gains are classified into a same group, and another 6 terminal devices far from the base station and having smaller channel gains are classified into another group. FIG. 3B illustrates an exemplary manner for grouping terminal devices in accordance with an embodiment herein. In FIG. 3B, the grouping method used in the mode domain multiple access system makes the channel gain differences between the terminal devices within a same group as large as possible, that is, there is diversity as large as possible for the channel gains of the terminal devices in the same group. In order to make the channel gain differences of the terminal devices in the same group as large as possible, the variance of the channel gains of the terminal devices in the group can be required to be as large as possible. In an example, it is required that the variance of the channel gains of the terminal devices within the group to be greater than a predetermined threshold, that is, the variance is as large as a certain degree. As shown in FIG. 3B, 3 terminal devices closest to the base station and having larger channel gains and 3 terminal devices farthest from the base station and having smaller channel gains are classified into a same group, and the rest 6 terminal devices, closer to the base station or farther from the base station, are classified into another group. Compared with the grouping manner of FIG. 3A, the exemplary grouping manner of FIG. 3B makes the channel gain differences of the terminal devices in the same group larger (i.e., the channel gain has a larger variance or diversity), and thus is a preferred grouping method in the present disclosure. When the channel gain differences of the terminal devices in the same group is large, detecting or decoding the data in the same group based on the serial detection algorithm can reduce the detection error, such that the complexity of detection or decoding can be reduced, compared with using the parallel detection algorithm alone.

In an example, system resources are allocated to the respective groups accordingly after grouping of the terminal devices, and in general, the resources allocated to a single group are more than resources required by a single terminal device and less than resources required by all the terminal devices within the group. The above terminal device grouping enables terminal devices within a same group to multiplex a same group of resources, for example, by using the mode domain multiple access (e.g., SCMA) technology within the same group, and enables terminal devices within different groups to use different resources, i.e., resources for different groups are used in an orthogonal manner with each other. In the case of using SCMA, since SCMA is a synchronous coding technique, the terminal devices are required to keep synchronized in system. Therefore, in this case, terminal devices meeting the synchronization condition can be classified into a same group.

It is to be noted that the terminal device information can comprise channel state information corresponding to the uplink and downlink, such as, the channel gain corresponding to the uplink and downlink. The terminal devices can be grouped for the uplink and downlink respectively, according to the channel state information of the uplink and downlink, and the grouped terminal devices can be applied to the uplink and downlink data transmission respectively. However, those skilled in the art can appreciate that in the case where there is reciprocity between the uplink and downlink channels, the terminal device grouping can be performed only for the uplink or only for the downlink, and the terminal device grouping result can be applied to both of the uplink and downlink data transmission, thereby mitigating the computational load associated with terminal device grouping. A typical scenario for this case is in a time division duplex (TDD) communication system. In a frequency division duplex (FDD) communication system, it can be deemed the uplink and downlink channels substantially satisfy the reciprocity if the uplink and downlink bands are sufficiently close. For uplink transmission, the base station can perform channel estimation based on, e.g., uplink reference signal transmitted from each terminal device, thereby obtaining uplink channel state information of each terminal device: for downlink transmission, each terminal device can perform channel estimation based on, e.g., downlink reference signal transmitted by the base station, thereby obtaining respective downlink channel state information and feeding it back to the base station.

According to some embodiments, classifying terminal devices into groups comprises at least one of: 1) ordering the terminal device based on the channel gains, and classifying each terminal device into different groups in order; 2) matching the terminal devices into group configuration templates based on the channel gains, wherein the group configuration template specifies the number of terminal devices within a group and channel gain levels of the terminal devices. Exemplary operations of terminal device grouping in accordance with an embodiment herein are described below with reference to FIGS. 4A and 4B.

Figure 4A:
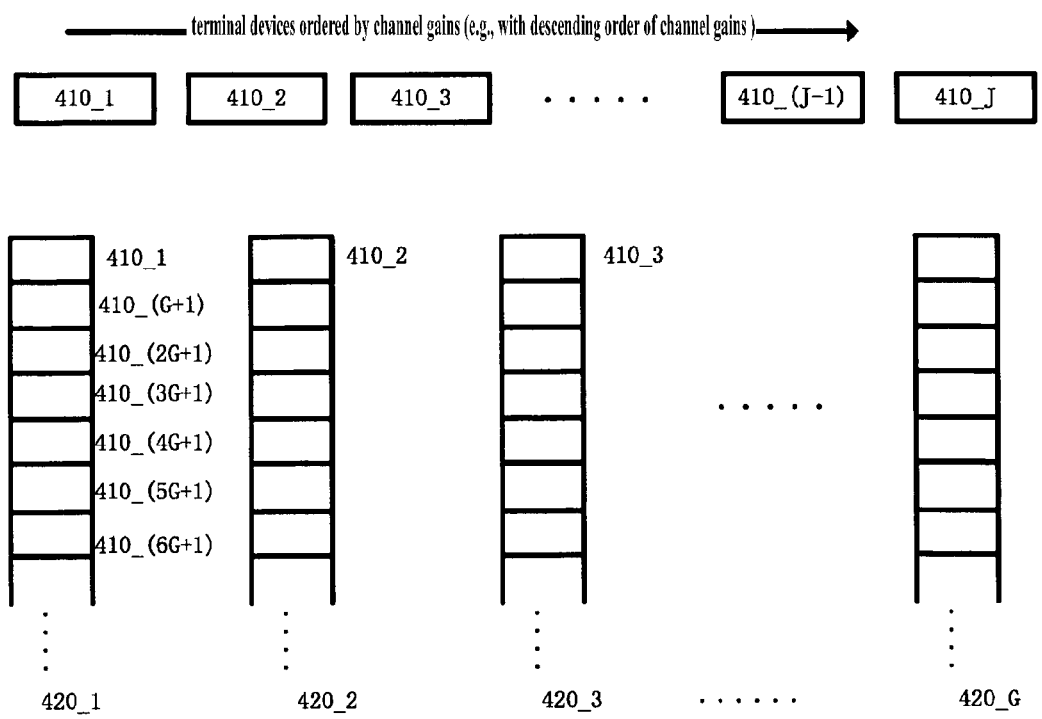
FIGS. 4A and 4B illustrate exemplary operations of grouping terminal devices in accordance with an embodiment herein.

FIG. 4A illustrates an exemplary operation of terminal device grouping in accordance with an embodiment herein. In FIG. 4A, in order to classify J terminal devices 410_1 to 410_J into G groups 420_1 to 420_G, these terminal devices are first ordered based on channel gains in an ascending or descending order (in this example, in the descending order of the channel gains). Then, the ordered terminal devices are classified or allocated to the respective groups in order. For example, in the first round of allocation, the terminal device 410_1 can be classified into the group 420_1, the terminal device 410_2 can be classified into the group 420_2, and so on, until the terminal device 410_G can be classified into the group 420_G. Then, in the second round of allocation, another G terminal devices starting from the terminal device 410_(G+1) can also be classified into the G groups in order. The next round of allocation is then made until all terminal devices are classified into the groups. Taking the group 410_1 as an example, it can be understood that the terminal devices finally classified into this group are 410_1, 410_(G+1), 410_(2G+1), and the like. In this way, terminal devices with similar channel gains are classified, as much as possible, into different groups, so that the channel gain difference between terminal devices within the same group is as large as possible.

Figure 4B:
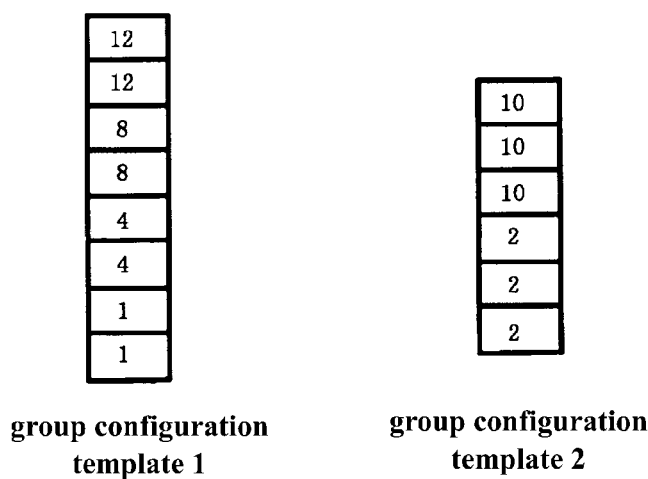

In another exemplary operation of terminal device grouping, predetermined group configuration templates can be stored in the electronic device 200, and the group configuration templates can specify the number of terminal devices that can be classified into a group and the channel gain levels of corresponding terminal devices. In this example, the process of classifying the terminal devices into groups is actually matching a specified number of terminal devices conforming to the channel gain levels into a group configuration template according to the group configuration template, thereby instantiating one or more terminal device grouping process. FIG. 4B illustrates an example of a group configuration template for terminal device grouping in accordance with an embodiment herein. As shown in FIG. 4B, the group configuration template 1 specifies that a group can have eight terminal devices, wherein the channel gains of two terminal devices are 12, the channel gains of another two terminal devices are 8, and the channel gains of another two terminal devices is 4, and the channel gains of the remaining two terminal devices is 1. Similarly, the group configuration template 2 specifies that a group can have six terminal devices, of which three terminal devices have a channel gain of 10 and the remaining three terminal devices have a channel gain of two. When performing terminal device grouping, for example, for the case where there are 40 terminal devices in the system, there can be 24 terminal devices conforming to the channel gain levels and instantiated into 3 groups according to the group configuration template 1, and there can be 12 terminal devices conforming to the channel gain levels and instantiated into 2 groups according to the group configuration template 2, and the remaining 8 terminal devices can be classified into separate groups due to channel gain mismatch. Of course, in other examples, the above remaining 8 terminal devices can also be instantiated as further groups according to additional group configuration templates.

It is to be noted that the more the terminal devices are within a group, the more resources are allocated to this group, then the greater the detection complexity is, and vice versa; the larger the differences exist among the channel gains of the terminal devices within a group, the better the detection performance is, and vice versa. Therefore, when the group detection template is predetermined, different detection requirements need to be considered, and the group detection template meeting detection requirement can be determined based on the number of terminal devices within the group and the channel gain differences.

It is also to be noted that the above channel gain values in the group configuration template can be an absolute value of the channel gain or a normalized value. Moreover, in the process of matching the terminal devices into the group configuration template based on the channel gains, it may be unnecessary to require that the channel gains of the terminal devices are exactly the same as the channel gains specified in the group configuration template; instead, the two can be matched within a certain tolerance. In this manner, each channel gain in the group configuration template can be a range of channel gains, and the channel gains falling within the range can be matched to corresponding locations within the group configuration template. For example, for group configuration template 2, the channel gains of the six terminal devices actually matching the template can be [10.9, 9.8, 9.7, 2.5, 2.0, 1.9].

Classifying the terminal devices into groups in the above manner can make differences between channel gains of the terminal devices within the same group as large as possible or at least larger than a predetermined threshold. It can be understood that the above manners are merely exemplary, and those skilled in the art can contemplate other grouping methods to achieve substantially the same effects. For example, in classifying terminal devices into groups, a terminal device can first be allocated for each group as an initial terminal device, and then a terminal device having the largest channel gain difference from the initial terminal device can be added. In an embodiment, the difference between channel gains of two terminal devices can be defined as $d_{i,j}$ as follows:

$$d_{i,j} = \begin{cases} h_i/h_j, & h_i > h_j \\ h_j/h_i, & h_i < h_j \end{cases}$$

Wherein, $h_i$ represents the channel gain of the ith terminal device, and $d_{i,j}$ represents the difference in channel gains between the ith and jth terminal devices. According to the number of groups G, one terminal device $U_g$, g=1, 2, ..., G is randomly allocated to each group as an initial terminal device. Then, one terminal device to be added is selected for each group, such that difference in channel gains between this terminal device to be added and the initial terminal device allocated to the group is the largest, that is, $$\underset{i}{\mathrm{argmax}}\, d_{i,g}.$$

After adding the selected terminal device to each group, the selecting and adding process is repeated. That is, each time the terminal device having the largest difference in channel gain from the initial terminal device allocated to the group is selected and added until all the terminal devices are classified into the respective groups.

As indicated above, the electronic device 200 (e.g., by the preprocessing unit 205) can further be configured to determine an initial data detection scheme. In addition to the exemplary methods below, those skilled in the art can also determine the data detection scheme in any suitable manner.

In an embodiment, determining the data detection scheme comprises classifying the terminal devices within respective groups into levels, such that at least one level comprises two or more terminal devices. According to results of such classification, terminal devices from different levels can be detected by a serial detection algorithm, and two or more terminal devices within a same level can be detected by a parallel detection algorithm. In an exemplary embodiment, classifying the terminal devices within the respective groups comprises classifying the terminal devices into corresponding levels based on the channel gains, and detection orders are more in front for data streams for the terminal devices within the levels corresponding to higher channel gains. For example, a terminal device with a higher channel gain is classified into a level with a detection order more in front, a terminal device with a medium channel gain is classified into a level with a detection order in the middle, and a terminal device with a lower channel gain is classified into a level with a later detection order. In this manner, different levels formed by data streams for terminal devices with larger difference in channel gains can be detected in serial by the serial detection algorithm, and data streams for terminal devices with similar channel gains can be detected in parallel by the parallel detection algorithm.

As indicated above, in a mode domain multiple access system, the greater the number of resources and the number of terminal devices are, the higher the complexity of the parallel detection algorithm is. Considering that the complexity of the serial detection algorithm can be lower than that of the parallel detection algorithm, in order to further reduce the detection complexity and to preserve the advantages of better detection performance of the parallel detection, on the basis of terminal device grouping, a feasible exemplary operation can be as follows: classifying the terminal devices within the respective groups into levels, such that one or more levels can comprise two or more terminal devices, and terminal devices from different levels can be detected by a serial detection algorithm, and two or more terminal devices from a same level can be detected by a parallel detection algorithm. In this manner, a data detection scheme based on the serial detection algorithm is obtained, which scheme treats the entire levels within the terminal device group as objects for the serial detection, and the respective terminal devices within a single level is treated as objects for parallel detection.

In the case where the above grouping method can make differences in channel gains between the terminal devices within a same group as large as possible or larger than a predetermined threshold, classifying the terminal devices into the respective levels based on the channel gains can lower the detection error from the serial detection algorithm, such that the detection scheme based on the serial detection algorithm (including a combination of the serial detection algorithm and the parallel detection algorithm) can take into account both the complexity and the detection error.

The above data detection scheme can be applied to both uplink data transmission and downlink data transmission. For uplink data transmission, the data detection scheme can be performed by the base station; for downlink data transmission, the data detection scheme can be performed by each terminal device.

Specifically, for uplink data transmission, detection of each level in the data detection scheme based on the serial detection algorithm can be performed by a base station. For example, for detection of the first level, the base station can receive, as input, signals multiplexed by the multiple access in mode domain (e.g., SCMA) from respective terminal devices within a specific group, and detect signals from terminal devices within the first level of the group by the parallel detection algorithm (e.g., MPA). In detection of the first level, data streams from the first level of terminal devices are detected in parallel, while signals from terminal devices within subsequent levels (i.e., the second level, third level, etc.) are treated as interferences or noises. Then, detection of the second level can be performed, in which the received signals with a portion corresponding to the signals for the terminal devices within the first level subtracted therefrom are treated as input for detection of the second level, and signals from the second level of terminal devices are detected by the parallel detection algorithm. Similarly, in detection of the second level, the data streams from the terminal devices within the second level are detected by the parallel detection algorithm, while signals from the terminal devices within the subsequent levels (i.e., the third level, the fourth level, etc.) are treated as interferences or noises. Thereafter, the detection of the third level, the fourth level, and the like is similarly performed, until the detection of all the levels is completed and signals from the terminal devices within each level in the group are detected. It is to be noted that the input for detection of the first level can be the received signal, from detection of the second level on, the portion corresponding to the signals for the terminal devices within the previous level(s) needs to be subtracted from the received signal and the resulted signals serve as input for detection of each next level. In a preferred example, the terminal devices with larger channel gains are classified into the first level. Then, even if there are interferences from subsequent levels, detection of the first level can still be done with a higher success rate, thereby avoiding error propagating to detection of subsequent levels. The same principle applies to each later level, which improves the overall decoding success rate.

For downlink data transmission, detection of some or all levels in the data detection scheme based on the serial detection algorithm can be performed by terminal devices within each level in a particular group. Unlike the base station performing detection of all levels in the uplink data transmission, in the downlink data transmission, the terminal devices within each level can perform the detection scheme based on the serial detection but until the level of detection corresponding to the terminal device's level. For example, the terminal devices within the first level can perform only detection of the first level, wherein the terminal devices can receive, as input, signals multiplexed by the mode domain multiple access technology (e.g., SCMA) transmitted from the base station to each terminal device within the specific group, and detect signal transmitted to the terminal device per se within the first level by the parallel detection algorithm (e.g., MPA). The terminal devices within the second level need to perform detection of the first level and the second level, wherein this detection of the first level is similar to that of the terminal devices within the first level. In detection of the second level, the terminal devices within the second level can subtract a portion corresponding to the signals for the terminal devices within the first level from the received signals, use the resulted signals as input for detection of the second level, and detect signals transmitted to the terminal devices within the second level by the parallel detection algorithm. The terminal devices within the third level needs to perform detection of the first level to the third level, the terminal devices within the fourth level need to perform detection of the first level to the fourth level, and so on. The terminal devices within the last level need to perform all levels of detection, in order to make it possible to detect signals transmitted to the terminal devices within respective levels. It is to be noted that the input for detection of the first level can be the received signals, from detection of the second level on, the portion corresponding to the signals for the terminal devices within the previous level needs to be subtracted from the received signal and the resulted signals serve as input for detection of each next level.

In an example, in order to determine a data detection scheme based on a serial detection algorithm (e.g., SIC) for terminal devices within a single group, the respective terminal devices can be classified into several levels based on the channel gains. Since the serial detection algorithm is characterized by detecting first a terminal device that is relatively easy to detect (for example, the terminal device with higher channel gain, with higher received SNR), data streams for the terminal devices within a level corresponding to a higher channel gain can be detected with an order more in front. In an example, channel gains with differences within a certain threshold range can be classified into one level. For example, for channel gains of 6 terminal devices [10.9, 9.8, 9.7, 2.5, 2.0, 1.9], in a situation, assuming a threshold range of 2, the channel gains [10.9, 9.8, 9.7] can be considered to correspond to one level since the maximum difference is 10.9-9.7=1.2 (<2); similarly, the channel gains [2.5, 2.0, 1.9] can be considered to correspond to another level since the maximum difference is 2.5-1.9=0.6 (<2). Thereafter, the first three terminal devices can be classified into the first level, and the last three terminal devices can be classified into the second level. In another situation, assuming a threshold range of 1, the channel gain 10.9 can be considered to correspond to one level alone, since 10.9-9.8=1.1 (>1); the channel gains [9.8, 9.7] can be considered to correspond to one level, and the channel gains [2.5, 2.0, 1.9] can be considered to correspond to another level.

Figure 5A:
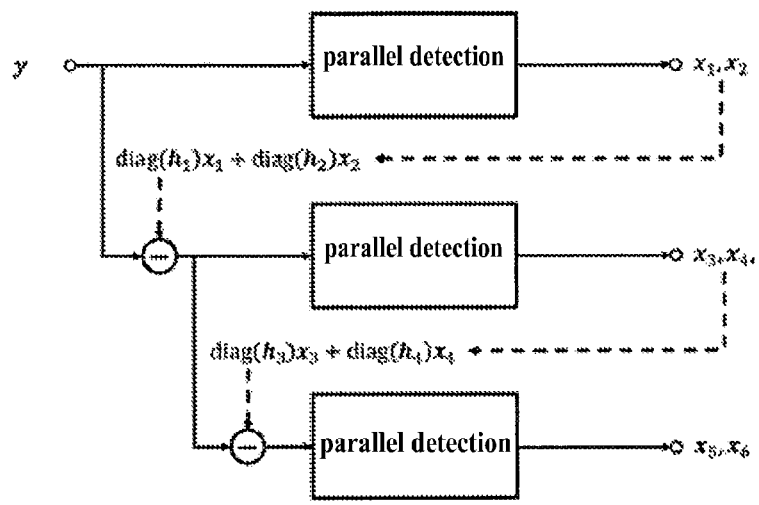
FIGS. 5A-5D illustrate detection processing of an exemplary data detection scheme in accordance with an embodiment herein.
Figure 5B:
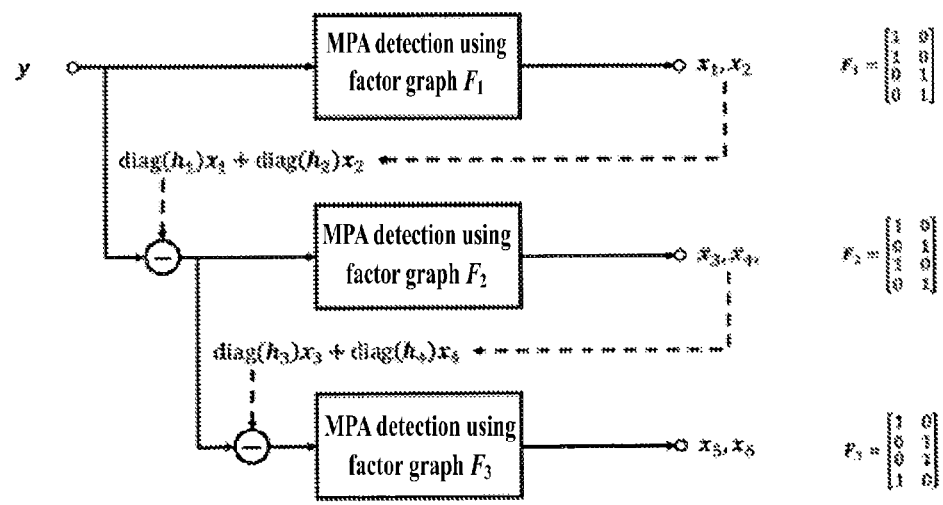
Figure 5C:
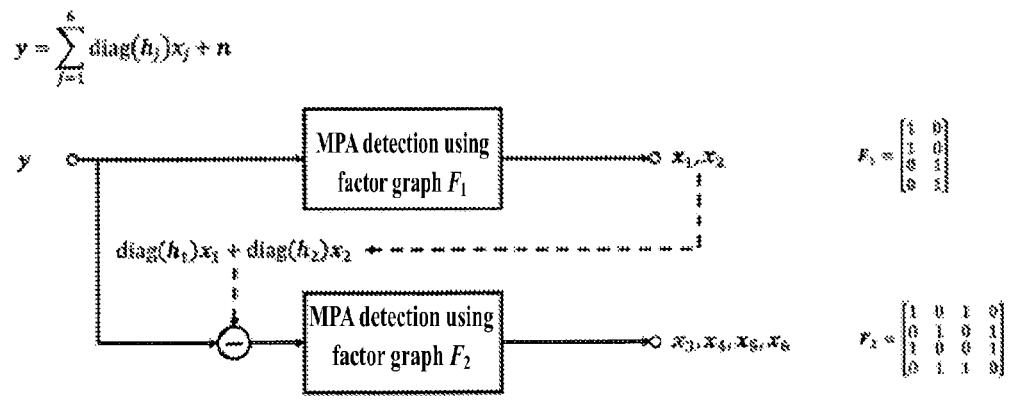
Figure 5D:
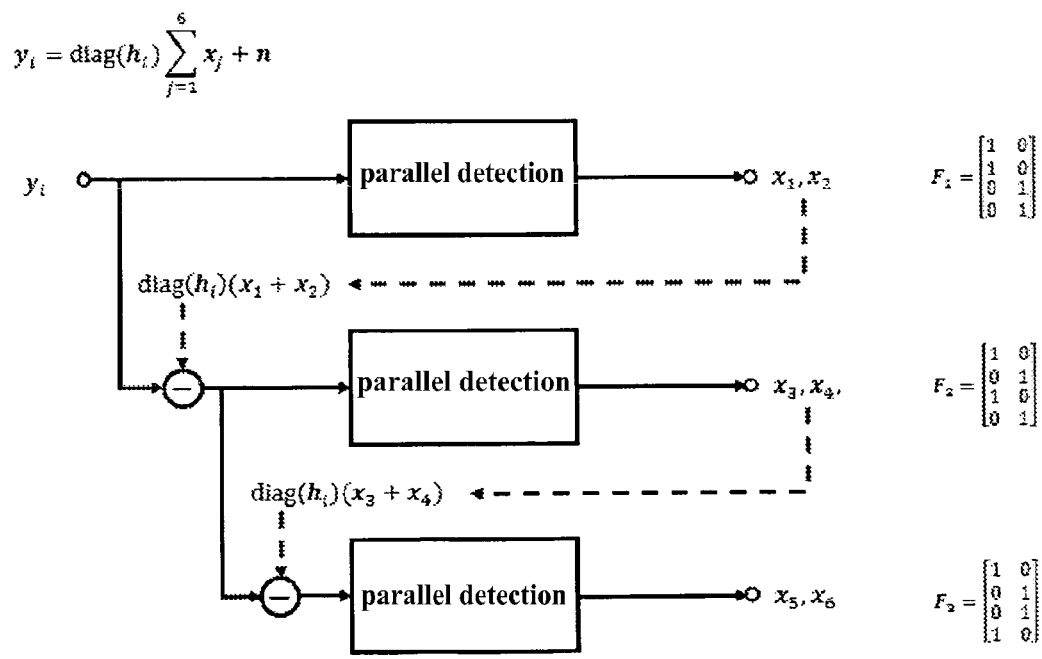

The detection processing of the exemplary data detection scheme in accordance with an embodiment herein is described below with reference to FIGS. 5A-5D, wherein FIGS. 5A-5C are examples of detection of uplink data transmission, and FIG. 5D is an example of detection of downlink data transmission. Some embodiments herein relate to a serial detection receiver that can be configured to perform detection processing of the data detection scheme. For example, the serial detection receiver can be configured with at least two stages of parallel detection units, for decoding level by level the received mode domain multiple access signals, wherein each stage of parallel detection unit supports parallel data detection for multiple terminal devices, the decoding output from the parallel detection unit of the previous stage serves as the known interferences to the parallel detection unit of the subsequent stage in order to be cancelled from the received signals. In addition, orthogonality among resources of target data streams in the parallel detection unit of the previous stage is better than orthogonality among resources of target data streams in the parallel detection unit of the subsequent stage. In an example, the multiple access in mode domain comprises SCMA or PDMA. The electronic device for a wireless communication system in accordance with the present disclosure can comprise the above serial detection receiver.

FIG. 5A illustrates detection processing of an exemplary data detection scheme based on a serial detection algorithm, in accordance with an embodiment herein. As shown in FIG. 5A, for 6 terminal devices 1 to 6 in a specific group in the mode domain access system, it is assumed that the terminal devices 1 and 2 are classified into a first level, the terminal devices 3 and 4 are classified into a second level, and the terminal devices 5 and 6 are classified into a third level. The data for the 6 terminal devices are multiplexed by the multiple access in mode domain, then wirelessly transmitted and received at the receiving end. The received signal can be expressed as $y=\Sigma_{j=1}^{6} \text{diag}(hj)xj+n$, wherein hj represents the channel matrix of the terminal device j, xj represents data for the terminal device j, n represents the noise, and diag represents a diagonal matrix constructed with vectors in the parenthesis. For the received signal y, data for the respective terminal devices can be detected level by level on the basis of the data detection scheme based on the serial detection algorithm. Detection of the first level is first performed (e.g., can be performed by first stage of the parallel detection units of the serial detection receiver), for the input signal y, the first level of the terminal devices is taken as object of the serial detection, and the data x1, x2 for the terminal devices 1 and 2 are decoded by the parallel detection algorithm; then, detection of the second level follows (e.g., can be performed by second stage of the parallel detection units), the portion corresponding to the decoded data x1, x2 is subtracted from the input signal y and the resulted signal serves as input, the second level of the terminal devices is taken as object of the serial detection, and the data x3, x4 for the terminal devices 3 and 4 are decoded by the parallel detection algorithm: for detection of the third level (e.g., can be performed by third stage of the parallel detection units), and the portion corresponding to the decoded data x3, x4 is subtracted from input signal from the previous stage and the resulted signal serves as input, and the third level of the terminal devices is taken as object of the serial detection, and the data x5, x6 for the terminal devices 5 and 6 are decoded by the parallel detection algorithm. In the uplink data transmission, the base station can decode the data for the terminal devices 1 to 6 by using the above operations.

According to an embodiment, the serial detection algorithm can be, for example, the sequential interference cancellation (SIC) algorithm, the parallel detection algorithm can be, for example, the MPA algorithm. In this case, the detection processing can still be performed using the above serial detection receiver, and this serial detection receiver can be implemented as an SIC receiver, and the parallel detection unit can be implemented as an MPA unit. FIG. 5B illustrates detection processing of an SIC-based exemplary data detection scheme, in accordance with an embodiment herein. This example can be similar to FIG. 5A, except that specific algorithms are defined. This data detection scheme can be used, for example, for an SCMA system. As shown in FIG. 5B, there are still 6 terminal devices 1 to 6 classified into 3 levels. After being multiplexed by SCMA, data for the 6 terminal devices is wirelessly transmitted and received at the receiving end, which is represented as y. For the received signal y, the data for each terminal device can be detected level by level using the data detection scheme based on the serial detection algorithm SIC. Detection of the first level can be performed first (e.g., can be performed by first stage of the MPA units of the SIC receiver). For input signal y, the first level of the terminal device is taken as object of the SIC detection, and data x1, x2 for the terminal devices 1 and 2 are decoded by the MPA, wherein the MPA decoding can adopt the factor graph F1 corresponding to the terminal devices 1 and 2 (i.e., the factor graph formed by columns corresponding to the terminal devices 1 and 2 and taken out from the system factor graph), as shown on the right in FIG. 5B. Next, detection of the second level can be performed (e.g., can be performed by second stage of the MPA units). A portion corresponding to the decoded data x1, x2 is subtracted from the input signal y and the resulted signal serves as input, the second level of the terminal device is taken as object of the SIC, and the data x3, x4 for the terminal devices 3 and 4 are decoded by the MPA, wherein the MPA decoding can adopt the factor map F2 corresponding to the terminal devices 3 and 4 (i.e., the factor graph formed by columns corresponding to the terminal devices 3 and 4 and taken out from the system factor graph), as shown on the right of FIG. 5B. For detection of the third level (e.g., can be performed by third stage of the MPA units), a portion corresponding to the decoded data x3, x4 is subtracted from input signal from the previous stage and the resulted signal serves as input, and the third level of the end device is taken as object of the SIC detection, and the data x5, x6 for the terminal devices 5 and 6 are decoded by the MPA, wherein the MPA decoding can adopt the factor graph F3 corresponding to the terminal devices 5 and 6 (i.e., the factor graph formed by columns corresponding to the terminal devices 5 and 6 and taken out from the system factor graph), as shown on the right of FIG. 5B. As indicated earlier, for an SCMA system, the detection complexity at each resource factor node is proportional to $M^{d_f}$. As shown in the factor graphs F1 to F3 in FIG. 5B, classifying the terminal devices within a group into levels actually reduces the number of terminal devices $d_f$ that may overlap on a single resource factor node in each MPA detection, thus can reduce complexity of each MPA detection.

FIG. 5C illustrates detection processing of another exemplary SIC-based data detection scheme, in accordance with an embodiment herein. The example of FIG. 5C is similar to FIG. 5B, except that the terminal devices 1 to 6 within the group are classified into two levels. As shown in FIG. 5C, the terminal devices 1 and 2 are classified into the first level, and the terminal devices 3 to 6 are classified into the second level. The data for these 6 terminal devices are multiplexed by SCMA, and wirelessly transmitted then received at the receiving end, the received signal is represented as y. For the received signal y, the data for each terminal device can be detected on the basis of the data detection scheme based on SIC. Detection of the first level is performed first. For the input signal y, first level of the terminal devices is taken as object of the SIC detection, and the data x1 and x2 for the terminal devices 1 and 2 are decoded by the MPA, wherein the MPA decoding can adopt a factor graph corresponding to the terminal devices 1 and 2, as shown on the right of FIG. 5C (i.e., the factor graph formed by columns corresponding to the terminal devices 1 and 2 and taken out from the system factor graph). Then detection of the second level follows. A portion corresponding to the decoded data x1 and x2 is subtracted from the input signal y and the resulted signal serves as input. The second level of the terminal devices is taken as object of the SIC detection, and the data x3, x4, x5 and x6 for the terminal devices 3 to 6 are decoded by the MPA, wherein the MPA decoding can be adopt a factor graph corresponding to the terminal devices 3 to 6 (i.e., the factor graph formed by columns corresponding to the terminal devices 3 to 6 and taken out from the system factor graph). Similar to FIG. 5B, the detection processing of FIG. 5C can be performed using the above SIC receiver, except that the detection processing can be done by using just two stages of the MPA units, while the detection processing of FIG. 5B is done by using three stages of the MPA units.

The above FIG. 5A to FIG. 5C illustrate use cases of the present disclosure by taking the uplink data transmission as an example. It is to be understood that, for uplink and downlink data transmission, the data detection processing can be performed at the base station and each terminal device, respectively, and the processes are similar except that the data transmissions experience different channels. The detection of the downlink data herein is briefly described below with reference to FIG. 5D. As shown in FIG. 5D, for 6 terminal devices 1 to 6 within a specific group in the mode domain access system, it is assumed that the terminal devices 1 and 2 are classified into the first level, the terminal devices 3 and 4 are classified into the second level, and the terminal devices 5 and 6 are classified into the third level. The downlink data for these 6 terminal devices are multiplexed by the mode domain multiple access method, then wirelessly transmitted and received at a receiving end i, wherein the received signal can be expressed as $y_i = \text{diag}(h_i)\sum_{j=1}^{6} x_j + n$, where hi represents the channel matrix of the terminal device i, xj represents data for the terminal device j, n represents the noise, and diag represents a diagonal matrix constructed with vectors in the parenthesis. For the received signal yi of the terminal device i, the data for respective terminal devices can be detected level by level by using the data detection scheme based on the serial detection algorithm. Detection of the first level is performed first (e.g., can be performed by first stage of the parallel detection unit of the serial detection receiver). For the input signal yi, the first level of the terminal devices is taken as object of the serial detection, and the data x1, x2 for the terminal devices 1 and 2 are decoded by using the parallel detection algorithm. Then detection of the second level follows (e.g., can be performed by second stage of the parallel detection units). A portion corresponding to the decoded data x1, x2 is subtracted from the input signal yi and the resulted signal serves as input, the second level of the terminal devices is taken as objection of the serial detection, and the data x3, x4 for the terminal devices 3 and 4 are decoded by the parallel detection algorithm. For detection of the third level (e.g., can be performed by third stage of the parallel detection units), a portion corresponding to the decoded data x3, x4 is subtracted from input from the previous stage and the resulted signal serves as input, and the third level of the terminal devices is taken as object of the serial detection, and the data x5, x6 for the terminal devices 5 and 6 are decoded by the parallel detection algorithm. In the downlink data transmission, the terminal devices 1 and 2 can perform just detection of the first level, the terminal devices 3 and 4 need to perform detection of the first level and the second level, and the terminal devices 5 and 6 need to perform detection of the first level to the third level, thereby data for the respective terminal devices can be decoded. It can be understood that, assuming that the modulation mode is QPSK, that is, the number of points in the constellation is M=4, the complexity of the detection processing in FIG. 5B can be related to $(4^1+4^1+4^1)$, and the complexity of the detection processing in FIG. 5C can be related to $(4^1+4^2)$. For the same modulation mode and resource allocation method, complexity for just the MPA can be related to $(4^3)$ (since the number of terminal devices overlapping on each resource factor node is 3 in the entire factor graph constructed with F1 to F3), and the detection complexity of just the serial detection is the lowest. It can be seen that the exemplary data detection schemes of FIGS. 5B and 5C can achieve a compromise between the parallel detection algorithms (e.g., the MPA) and the serial detection algorithms (e.g., the SIC) for complexity. It can also be seen from FIGS. 5B and 5C that the more levels within the group are, the lower the detection complexity is, but the detection performance is reduced accordingly. Therefore, designing a detection algorithm by combining the serial detection algorithm and the parallel detection algorithm is also a compromise for the detection complexity and the detection performance.

As indicated above, the electronic device 200 (e.g., via the preprocessing unit 205) can further be configured to perform the initial resource allocation. An example of resource allocation within a group in accordance with an embodiment herein is described below with reference to FIG. 6. In addition to this example, those skilled in the art can perform the initial resource allocation in any suitable manner.

In an embodiment, the determined resource allocation within the group can minimize resource overlap between data streams for terminal devices within a same level. FIG. 6 illustrates the example of resource allocation within the group by taking the SCMA system as the example. The resource allocation in the SCMA system can be represented by a factor graph matrix F, wherein each row in the factor graph matrix F corresponds to one resource node, and each column therein corresponds to one terminal device, "1" for the element of the i-th row and the j-th column indicates that the terminal device j occupies resource i, "0" for the element of the i-th row and the j-th column indicates that the terminal device j does not occupy the resource i. The factor graph matrix F in FIG. 6 is an example corresponding to the detection algorithm in FIG. 5B, and F1, F2, and F3 are respectively formed by taking two columns out from F in order. In an example, it is similarly assumed that the terminal devices 1 and 2 are classified into the first level, the terminal devices 3 and 4 are classified into the second level, and the terminal devices 5 and 6 are classified into the third level. As shown in FIG. 6, the resource allocation within the group as indicated by F makes data streams for different terminal devices within each level occupy different resources, that is, the resource overlap is as few as possible (i.e., the minimum). In another example, it is assumed that the terminal devices 3 to 6 are classified into one level. Considering constraint of the resource allocation for each terminal device (i.e., the number of required resources is 2), although the resource allocation within the group represented by F cannot make data streams for the terminal devices 3 to 6 occupy different resources, the resource overlap can still be kept as few as possible.

The overlap between resources for the data streams for the terminal devices within a same level being as few as possible, actually reduces the number of terminal devices $d_f$ overlapping on a single resource factor node, and thus can reduce the detection complexity of each MPA. In an example, when the resource allocation within the group is performed, it is preferable to keep the overlap between resources for the data streams for the terminal devices within front level minimized, such that the detection of the terminal devices with the detection order more in front can be performed with better performance, and the error propagation problems in the serial detection can be avoided. In another example, the resource orthogonality can be made as much as possible between the data streams for the terminal devices with detection orders more in front in the serial detection and other data streams for the terminal devices with detection order behind, which also helps to avoid error propagation in the serial detection.

As indicated above, in uplink data transmission and downlink data transmission, different devices can perform the data detection scheme. For uplink data transmission, the data detection scheme can be performed by the base station. For downlink data transmission, the data detection scheme can be performed by the terminal device. Since the base station can be configured with more processing resources, the decoding capability is stronger, detections of various complexities can be performed. In contrast, a terminal device can generally be configured with limited processing resources, and the decoding capability is weak. Moreover, the decoding capabilities of different terminal devices can also be different, thus only a certain detection complexity can be supported by a certain terminal device. For example, some terminal devices can support parallel detection algorithms (such as, the MPA) and serial detection algorithms (such as, the SIC), while other terminal devices can just support serial detection algorithms (such as, the SIC). Therefore, for downlink data transmission, when performing the terminal device grouping and determining the data detection scheme, the electronic device 200 (e.g., the preprocessing unit 205) should consider the decoding capability of each terminal device, and perform appropriate terminal device grouping, level classifying and resource allocation within the group.

In an embodiment, for downlink data transmission from a base station to a terminal device, in the case where the decoding capability of a specific terminal device can just support the serial detection algorithm, classifying the terminal devices within the group into levels can comprise allocating a higher downlink transmission power for the specific terminal device and classifying the specific terminal device alone into a level with a detection order as in front as possible.

As described above, in general, classifying the terminal devices within a group into levels can comprise classifying the terminal devices into corresponding levels based on channel gains, and generally, the detection order is more in front for data streams for the terminal devices within levels corresponding to higher channel gains. Considering the decoding capability of the terminal device, in an example, when determining the data detection scheme, the terminal device supporting just the serial detection algorithm (e.g., the SIC) alone can be classified into one level, such that the terminal device does not need to perform the parallel detection within the level, but to decode by just the serial detection algorithm. Since the detection processing in front is relatively simple in serial detections, in order to further reduce processing load of the terminal device supporting only the serial detection algorithm (e.g, the SIC), it can be alone classified into a level with a detection order as in front as possible. Then, considering it is required for the received signal strength for the levels more in front to be higher in the serial detection, it is necessary to allocate a higher downlink transmission power to the terminal device to improve the received signal strength of the terminal device.

In an embodiment, for downlink data transmission from a base station to a terminal device, in the case where the decoding capability of a specific terminal device can just support the serial detection algorithm, classifying the terminal devices into groups further comprises classifying the terminal device supporting just the serial detection algorithm into a same group, and the terminal devices within this group are detected only by the serial detection algorithm.

In some cases, the decoding capability of the terminal device can be defined based on the processing capability of the terminal device, and the stronger the processing capability, the higher the corresponding decoding capability; and vice versa. In some cases, the decoding capability of the terminal device can further be modified according to the decoding delay requirement of service. The higher the decoding delay requirement, the lower the decoding capability, and vice versa. The decoding capabilities of the terminal devices can be represented in different manners. The following are two exemplary representations, and other suitable representations can be devised by those skilled in the art:

1) represented by a decoding capability indicator. For example, the decoding capability can be divided into five levels, represented by decoding capability indicators 1 to 5 (or A to E), 5 (or E) indicating the highest decoding capability, and 1 (or A) indicating the lowest decoding capability. For another example, the decoding capability indicator 1 can be used to indicate that the terminal device can support a parallel detection algorithm (e.g., the MPA, in which case the terminal device can also support a serial detection algorithm such as the SIC), and the decoding capability indicator 0 indicates that the terminal device supports only the serial detection algorithm (such as, the SIC).

2) represented by specific numerical parameters. For example, the parameter can be computing resource in the terminal device for decoding, for example, in GHz. The more computing resources for decoding in the terminal device, the stronger the corresponding decoding capability: and vice versa.

In an embodiment, the terminal device can initially report its decoding capability to the base station (e.g., in the form of RRC layer signaling, etc.), in order for the electronic device 200 to acquire and perform appropriate terminal device grouping, level classifying and resource allocation within the group.

In an embodiment, for downlink data transmission, the electronic device 200 (or the detection information collection unit 215) can be configured to obtain detection information for the downlink data transmission from the terminal devices, thereby performing at least one of re-grouping the terminal devices, re-allocating resources within respective groups, and updating data detection scheme.

Although various embodiments of preprocessing comprising grouping terminal devices, determining data detection schemes, and resource allocation have been described, it is to be understood that the specific manner of grouping, determining data detection schemes, and resource allocation is not limited to these embodiments. For example, conventional manners for preprocessing can be used to determine the data detection scheme (e.g., by using the parallel detection algorithm with just one level within the group), and resource allocations can be performed randomly or by using conventional manners, and the like.

The exemplary operations performed by the preprocessing unit 205 of the electronic device 200 are described in detail above with reference to FIGS. 3A-6. After performing the terminal device grouping, the initial resource allocation and after determining the initial data detection scheme, the preprocessing unit 205 needs to notify the terminal devices of the necessary information accordingly. For example, for uplink data transmission from the terminal device to the base station, the terminal device can be notified of the corresponding resource allocation result after the resource allocation is performed, and the terminal device can perform uplink data transmission according to the resource allocation result. For another example, for downlink data transmission from the base station to the terminal device, the terminal device can be notified of at least one of the corresponding terminal device grouping result, the resource allocation result and the data detection scheme, after performing at least one of the terminal device grouping, the resource allocation, and the determination of data detection scheme. The terminal device can receive downlink data according to the resource allocation result, and perform detection based on the data detection scheme in conjunction with information of other terminal devices in the group. It is to be noted that the principles and operations of the terminal device grouping, determination of the data detection scheme and the resource allocation, which are described with respect to the preprocessing unit 205, are equally applicable to the terminal device re-grouping, the data detection scheme update, and the resource re-allocation as performed by the updating unit 210.

Specific exemplary operations performed by the updating unit 210 of the electronic device 200 are described in detail below with reference to FIGS. 7-9. According to an embodiment herein, the updating unit 210 can be configured, for example, to perform at least one of re-grouping the terminal devices, re-allocating resources within respective groups, and updating data detection scheme, based on the detection information on the data transmission. According to an embodiment herein, the detection information can comprise, for example, detection error information, detection complexity information, and the like. For wireless communication systems, there are generally requirements for a bit error rate or a retransmission rate (i.e., statistical information on the number of retransmissions transmitted by HARQ) in data decoding. In an example, the detection error information can comprise a bit error rate level or a retransmission rate when detecting by the data detection scheme. In the case where the detection error information does not meet requirement for the bit error rate or the retransmission rate, it may be necessary to update the terminal device grouping, the resource allocation within the group, and/or the data detection scheme. In some cases, especially for the case of downlink transmission (since it is decoded by the terminal devices with limited processing capability), it is also necessary to consider the detection complexity at the time of data decoding, and it is desired that the actual detection complexity can be lower than a predetermined detection complexity threshold. In the cases where the detection complexity is higher the detection complexity threshold, it may also be necessary to update the terminal device grouping, resource allocation within the group, and/or the data detection scheme. The detection complexity information can comprise a detection complexity when detecting by the data detection scheme. In an example, the level of detection complexity can be represented by the time it takes to decode the data (also known as the decoding delay). A too large decoding delay can affect the spectral efficiency of the wireless communication system. As indicated above, there can be separate detection information for uplink and downlink data communication: moreover, the detection information comprises detection information for a specific terminal device (e.g., detection error information of the terminal device), detection information for a specific group (e.g., an average detection error information of the terminal devices within the group) and detection information for the entire system (e.g., an average detection error information of the terminal devices throughout the system).

In accordance with an exemplary embodiment, the principles and operations of the terminal device re-grouping, the data detection scheme update, and the resource reallocation performed by the updating unit 210 can be substantially the same as those of the terminal device grouping, the determination of the data detection scheme, and the resource allocation performed by the preprocessing unit 205 as described above, except that the timing or condition of execution is different. The specific execution process is thus not repeated here. Regarding the timing or condition of execution, the preprocessing unit 205 initially performs the corresponding operation before the data transmission, and the updating unit 210 performs the corresponding update operation combination in the data transmission process. In such data transmission process, the updating unit 210 can perform a combination of update operations based on the detection information of the data transmission, and the update operation combination can comprise at least one of the terminal device re-grouping, resource reallocation within the group, and the data detection scheme update. An exemplary update operation combination of the updating unit 210 in accordance with an embodiment herein is described below with reference to FIG. 7.

Figures 6, 7:
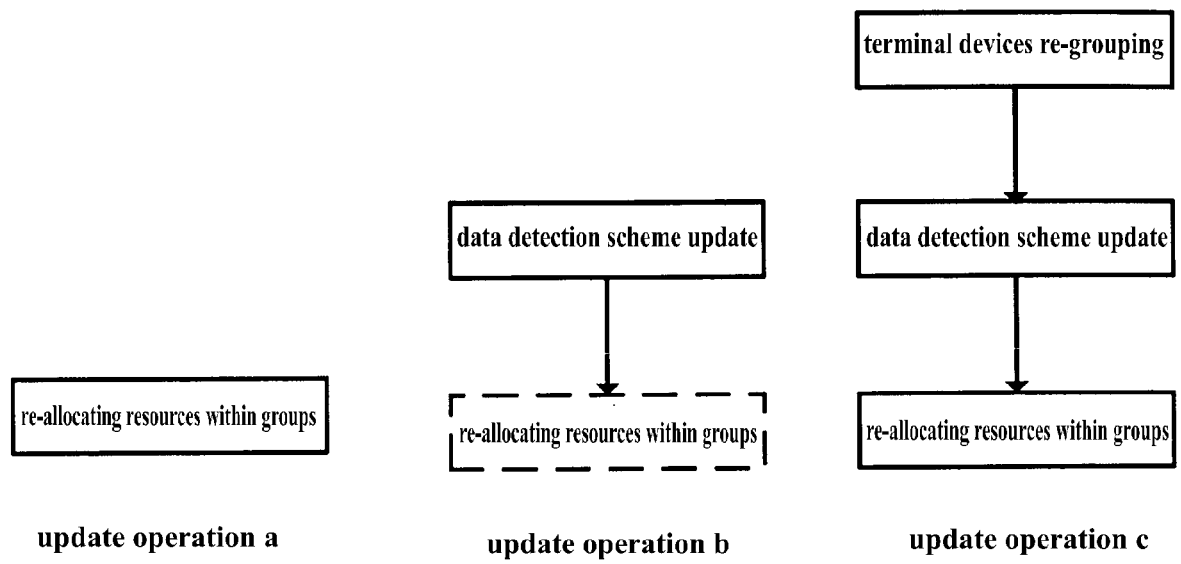
FIG. 6 illustrates an example of resource allocation within a group in accordance with an embodiment herein.
FIG. 7 illustrates combination of exemplary update operations of updating unit 210 in accordance with an embodiment herein.

As shown in FIG. 7, the update operation combination a can comprise just the resource reallocation operation within the group. For example, in the case where the initial resource allocation in the group does not minimize the overlap between resources for the data streams for the terminal devices within a same level in the group, the update operation combination a can be performed. By the resource reallocation operation within the group, the overlap between resources for the data streams for the terminal devices within the same level in the group can be reduced, and/or the overlap between resources for the data streams for the terminal devices with detection order in front in the serial detection and resources for the data streams for the terminal devices with detection order behind can be reduced. It is possible for the update operation combination a not to involve data detection scheme update and terminal device re-grouping, but just adjust resource allocation between data streams for terminal devices within the group. FIG. 9 illustrates an exemplary resource allocation within the group before and after performing the update operation combination a, in accordance with an embodiment herein. In this case, the update operation combination a adjusts resource allocation for data streams for the terminal device 2 in the first level, in order to reduce the resource overlap with the data streams for the terminal device 1 within the first level.

As shown in FIG. 7, an update operation combination b can comprise the data detection scheme update, and can further comprise resource reallocation within the group depending on the situations. In an example, the update operation combination b can adjust the detection order (i.e., detection level) in the serial detection algorithm of the data flows for each terminal devices in the group by the data detection scheme update (e.g, thereby classifying respective terminal devices into levels based on the channel gains), and/or adjust the number of levels of serial detection in the serial detection algorithm. Then, the update operation combination b can further perform resource reallocation within the group, such that the overlap between resources for data streams for the terminal devices within the same level in the group is reduced, and in some cases, the overlap between resources for the data streams for the terminal devices with detection order in front in the serial detection and resources for the data streams for the terminal devices with detection order behind is reduced. An example of adjusting the number of levels in the serial detection can be seen in the exemplary detection operations of FIGS. 5B and 5C. Reducing the number of detection levels within a group (e.g., adjusting the detection operation from FIG. 5B to FIG. 5C) can improve detection performance, increasing the number of the detection levels within the group (e.g., adjusting the detection operation from FIG. 5C to FIG. 5D) can reduce the detection complexity.

As shown in FIG. 7, an update operation combination c can comprise terminal device re-grouping, data detection scheme update, and resource reallocation within the group. In an example, the update operation combination c can re-group the terminal devices in the system to increase difference in the channel gains of the terminal devices within the group. For example, in the case where the channel state (e.g., channel gains) of each terminal device changes over time, re-grouping may be required. Then, the update operation combination c can adjust detection order in the serial detection algorithm of the data flows for respective terminal devices in the group by the data detection scheme update, and/or adjust the number of levels of serial detection in the serial detection algorithm. Subsequently, the update operation combination c can further perform resource reallocation within the group, in order to reduce overlap between resources for data streams for a same level of terminal devices within the group, and in some cases, the overlap between resources for the data streams for the terminal devices with detection order in front in the serial detection and resources for the data streams for the terminal devices with detection order behind can be reduced.

It can be seen that the complexity for execution of the update operation combinations a-c as shown in FIG. 7 is increased. The update operation combination a has the lowest complexity, which can perform just resource reallocation within the group without terminal device re-grouping and data detection scheme update. In the case of performing the update operation combination a, for the uplink data transmission, the base station can notify, the terminal device to which resources have been reallocated, of the updated mapping matrix V of the terminal device; for the downlink data transmission, the base station can notify the terminal devices of the corresponding columns in the updated factor graph matrix F. The complexity of the update operation combination b is the second, which requires re-classifying the terminal devices into levels within the existing group, such that the level of at least one terminal device is adjusted, and the resource allocation process is also required after the level classifying process. In the case of performing the update operation combination b, for the uplink data transmission, the base station as the data transmission receiver needs to update the detection order of the terminal devices within the group based on results of level re-classifying, and notify the terminal device to which the resources have been reallocated of the updated mapping matrix V of the terminal device; for downlink data transmission, the base station notifies each terminal device in the group of its updated serial detection level and makes each terminal device update the corresponding column in the factor graph matrix F. For the update operation combination c, the terminal device re-grouping can at least affect terminal devices within two groups, and it is even possible to perform grouping operations such as those described with reference to FIG. 4A or FIG. 4B for all terminal devices in the system. After the re-grouping operation, the level re-classifying and resource re-allocation within the group are required for the adjusted groups, so the update operation combination c has the highest complexity. In the case of performing the update operation combination c, for the uplink data transmission, the base station as the data transmission receiver needs to update results of the grouping and level classifying, and notify the terminal device to which resources have been reallocated of the updated mapping matrix V of the terminal device. For downlink data transmission, the base station notifies each terminal device of the updated groups and levels, and each terminal device updates the factor graph matrix F.

In an example, it is possible not to perform the resource reallocation operation within the group of the dashed box in the update operation combination b of FIG. 7. For example, after adjusting the detection order or the number of levels in serial detection, if the above requirement that resource overlap is as few as possible is met, the resource reallocation within the group may not be required. The update operation combination comprising just the data detection scheme update can be named as the update operation combination b'. In the case of performing the update operation combination b', for the uplink data transmission, only the detection orders of the terminal devices in the group are updated based on results of the level re-classifying at the base station; for the downlink data transmission, the base station notifies each terminal device of its updated serial detection level. From a signaling viewpoint, the complexity of the update operation combination b' may be lower than that of the update operation combination a. Although the update operation combinations a-c are described more in the following, it is to be understood that the update operation combination b' also applies and is equivalent to other update operation combinations. Due to its low complexity, in some cases, the update operation combination b' can have a higher execution priority (e.g., in FIG. 8B below, the combination b' can be performed in preference to the combination a in the case where the detection performance is satisfied).

Considering the complexity difference between different update operation combinations, it is possible to control to implement an update operation combination with appropriate complexity. The so-called the update operation combination with appropriate complexity means that the update operation combination can meet the detection performance requirements of the wireless communication system. In an example, the priorities of the update operation combination a-c can be set to be successively decremented. That is, the resource reallocation within the group is performed with the highest priority, and the data detection scheme update is performed with the next priority, and the terminal device re-grouping is performed with the lowest priority. Accordingly, an update operation combination with a high priority is first performed, and the update operation combination with the next priority is performed only when the high priority update operation combination cannot satisfy the detection performance requirement. In another example, considering that the execution complexity of the update operation combination c is rather high, different operation modes can be set in the system. For example, in mode 1, operation c is not allowed to be performed, only combinations a and b can be performed: in mode 2, operation c is allowed to be performed, and combinations a-c can be performed. Mode 1 and mode 2 can be selected, and mode 2 can be enabled only if mode 1 fails to meet the detection performance requirements.

In an embodiment, at least one of terminal device re-grouping, resource reallocation, and data detection scheme update based on the detection information can be performed in a periodic manner. In another embodiment, at least one of terminal device re-grouping, resource reallocation, and data detection scheme update based on the detection information can be event-triggered, and the trigger event can comprise detection performance reflected by the detection information (e.g., bit error rate, retransmission rate, etc.) does not meet performance requirements. For example, the trigger events can comprise the detection error not meeting the bit error rate or the retransmission rate requirement for a first predetermined duration and/or the detection complexity being above a detection complexity threshold for a second predetermined duration.

Figure 8A:
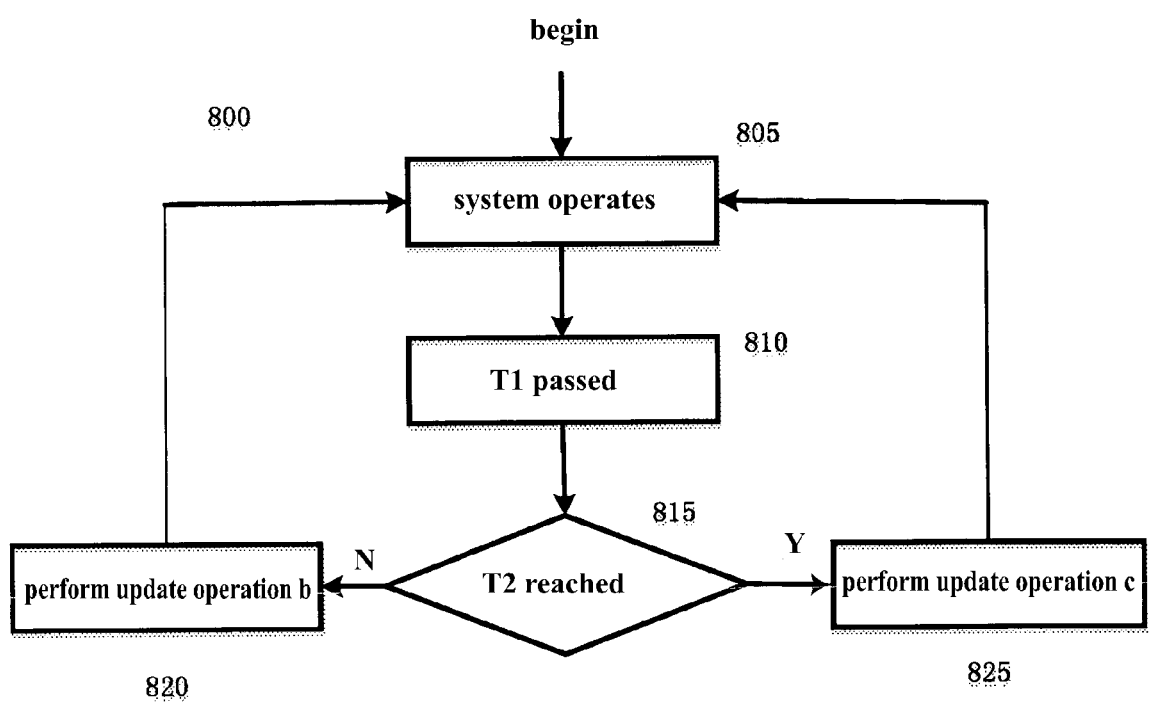
FIGS. 8A and 8B illustrate a flowchart of an exemplary method for performing combination of update operations on a periodic basis or according to a trigger event, in accordance with an embodiment herein.
Figure 8B:
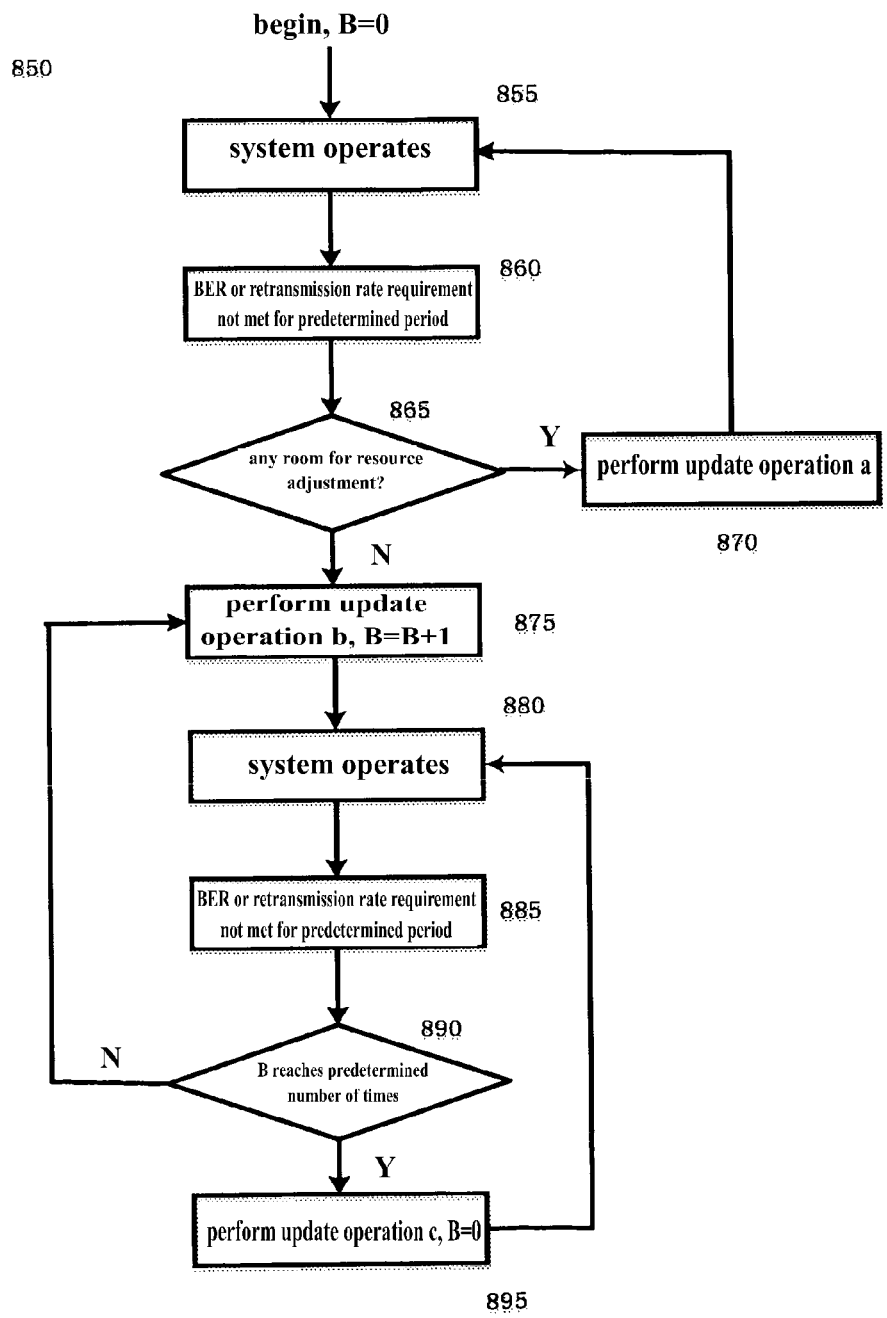

FIGS. 8A and 8B illustrate a flowchart of an exemplary method for performing update operation combinations on a periodic basis or according to some trigger event, in accordance with an embodiment herein. Since the wireless channel gain of each terminal device varies over time, it may be necessary to perform an appropriate update operation combination at a certain period. For example, considering the different complexities or priorities of different update operation combinations, a corresponding execution cycle can be preset for different update operation combinations. For example, the period T1 can be preset for the update operation combination b, and the period T2 can be preset for the update operation combination c, where T1<T2, that is, the execution frequency of the update operation combination c is lower than the execution frequency of the update operation combination b. FIG. 8A illustrates a flowchart of an exemplary method 800 for performing an update operation combination on a periodic basis, in accordance with an embodiment herein. As shown in FIG. 8A, in the method 800, at block 805, the wireless communication system operates normally. At block 810, time T1 elapses with respect to the start of operation. At block 815, it is determined if the elapsed time has reached T2. If not, then proceeds to block 820 to perform the update operation combination b and then return to block 805 to continue the system operation; if yes, this may occur after the update operation combination b in block 820 has been performed several times (depending on the relationship between the preset T1 and T2), then proceeds to block 825 to perform the update operation combination c and then return to block 805 to continue the system operation. Thereafter, the above process is repeated. Although the flowchart shows an exemplary process of periodically performing the update operation combinations b and c, the update operation combinations a and b, the update operation combinations a and c, or the update operation combinations a, b and c can be periodically performed in a similar manner.

In the case where the detection information can be obtained (including detection information for a specific terminal device, detection information for a specific group, and detection information for the entire system), an appropriate update operation combination can also be performed based on the trigger event. The detection information can comprise detection error information, and the trigger event can be, for example, that the detection performance determined based on the detection error information does not meet the bit error rate or the retransmission rate requirement. In an example, the trigger event can be that the detection performance does not meet the bit error rate or the retransmission rate requirement for a predetermined time. FIG. 8B illustrates a flowchart of an example method 850 of performing an update operation combination based on a trigger event, in accordance with an embodiment herein. It is to be noted that the trigger condition in FIG. 8B can be directed to the detection performance of a specific group or the entire system. As shown in FIG. 8B, the variable B is initialized to 0 at the beginning, where the variable B is used for counting, which indicates the number of times the update operation combination b is executed. In this example, a predetermined number of times for consecutively performing the update operation combination b is predetermined, and after the variable B reaches the predetermined number of times, the adjustment to grouping, resource allocation, and data detection scheme are performed by performing a more complicated update operation combination c. As shown in FIG. 8B, in the method 850, at block 855, the wireless communication system operates normally. At block 860, the detection performance (of a particular group or the entire system) does not meet the bit error rate or the retransmission rate requirement for a predetermined time. At block 865, it is determined whether there is any room for adjusting the resource allocations within the group. The case where there is room for adjusting the resource allocations within the group means that there is larger overlaps between resources for data streams for the terminal devices within a same level in the group, for example, and the resource overlaps can be reduced by adjustment. If yes in block 865, then proceeds to block 870 to perform an update operation combination a, then return to block 855 to continue the system operation; if not, proceeds to block 875 to perform an update operation combination b and add 1 to the value of B, then proceeds to block 880 and the system continues to run. The operations of block 880 and block 885 and the operations of block 855 and block 860 are similar. After operations of block 880 and block 885, it is determined at block 890 whether variable B has been reached a predetermined number of times. If no, returns to block 875 to repeat the operations of blocks 875 through 890. If yes, then proceeds to block 895 to perform an update operation combination c and set the value of B to zero. Then, returning to block 880, the system continues to run.

For the uplink transmission, the data detection is performed by the base station, it is thus easier for the electronic device 200 (or its detection information collection unit 215) to obtain the detection information. For the downlink transmission, the data detection is performed by each terminal device and the detection information is reported to the base station, it is thus relatively complicated for the electronic device 200 (or its detection information collection unit 215) to obtain the detection information. Therefore, the method as shown in FIG. 8B may be more suitable for the scenario of uplink transmission. However, this method can be applicable to the scenario of downlink transmission.

In accordance with an embodiment, the detecting information can comprise the detecting complexity information. The data detection scheme update can comprise increasing the number of levels of terminal devices within the terminal device group if the detection complexity is above the detection complexity threshold.

There are other cases where the update operation combinations are performed based on a trigger event. For example, the detection information can include the detection complexity information, and the trigger event can be, for example, the detection complexity is higher than a predetermined threshold. In this case, in order to reduce the detection complexity, the number of levels of serial detection within the group can be increased, for example, by incorporating this operation into the update operation combination b.

It is to be noted that the trigger condition of the update operations can also be directed to the detection performance of the specific terminal device. For example, the trigger event can be that the detection performance of the specific terminal device does not meet the bit error rate or the retransmission rate requirement for a predetermined time. The update operations can also be performed for the specific terminal device in accordance with an embodiment herein. For example, the resource allocation within a group can be adjusted first by the update operation combination a. Secondly, levels within the group can be adjusted by the update operation combination b. For example, if the detection performance of the terminal device 3 in FIG. 5B does not meet the requirement, the detection operation can be adjusted to the level classifying in FIG. 5C, in order to reduce the number of levels and to improve the detection performance. Thirdly, the terminal device re-grouping can be performed for the group containing the specific terminal device, to increase differences between the channel gains of the terminal devices within the group, for example, the differences between the channel gains of the specific terminal device and other terminal devices in the group can be specifically increased. Considering the situation of 12 terminal devices in the system, the channel gains are ordered from high to low as [8, 8, 8, 8, 4, 4, 4, 4, 2, 2, 1, 1], and are initially divided into two groups, both of which are [8, 8, 4, 4, 2, 1] to make the differences in channel gains as large as possible. Assuming that the detection performance of a terminal device with a channel gain of 8 in one of the groups does not meet the bit error rate requirement, then grouping for this terminal device needs to be adjusted to increase the differences in channel gains between the terminal device and other terminal devices within the group. After adjustment, the group containing this terminal device whose detection performance previously did not meet the bit error rate requirement is updated to [8, 8, 2, 2, 1, 1], and the other group is [8, 8, 4, 4, 4, 4].

According to the exemplary method of performing the update operation combination in FIG. 8B, it can be seen that in the case where the detection error for the data stream does not meet the bit error rate or the retransmission rate requirement, at least one of the following is performed: re-grouping the terminal devices, to increase differences between the channel gains of the terminal devices within the groups; updating the data detection scheme, to adjust detection orders in the serial detection algorithms for data streams for respective terminal devices in the groups; updating the data detection scheme, to adjust a number of serial detection levels in the serial detection algorithms; re-allocating resources within the groups, to reduce overlaps between resources for data streams for the terminal device with detection order in front and other data streams with detection orders subsequent thereto in the serial detection algorithms; and re-allocating resources within the groups, to reduce overlaps between resources for data streams for the terminal devices within a same level of a same group. According to an embodiment, the detection information can include detection error information, and the data detection scheme update can include reducing the number of levels within the group if the system average detection error does not meet the average error rate requirement. After the preprocessing unit 205 and the updating unit 210 of the electronic device 200 performing corresponding operations, the electronic device 200 can notify terminal devices of some operation results for use by the terminal devices. For uplink data transmission from the terminal device to the base station, after performing resource allocation and resource reallocation, the electronic device 200 can notify the terminal devices of the corresponding resource allocation result. For downlink data transmission from the base station to the terminal device, after performing at least one of terminal device grouping and re-grouping, resource allocation and reallocation, as well as determining and updating the data detection schemes, the electronic device 200 can notify the terminal devices of at least one of the corresponding terminal device grouping or re-grouping result, resource allocation or reallocation result, and the determined or updated data detection scheme.

As indicated above, for downlink transmission, data detection is performed by each terminal device and the detection information (e.g., detection error information and/or detection complexity information) is reported to the base station, in order to perform an appropriate update operation combination. Accordingly, for downlink data transmission from the base station to the terminal device, the electronic device 200 can be configured to obtain detection information of the downlink data transmission from the terminal device for performing at least one of terminal device re-grouping, resource reallocation within the group, and data detection scheme update.

Another exemplary electronic device for the wireless communication system in accordance with an embodiment herein is described below with reference to FIG. 10. In an exemplary application, the electronic device 1000 can be used for downlink data transmission in a mode domain multiple access system (in this case, the electronic device 1000 can also be provided with an uplink data transmission function). As shown in FIG. 10, in an embodiment, the electronic device 1000 can include an obtaining unit 1005. The operations or functions implemented by the electronic device 1000 and its units will be described below.

In an embodiment, the obtaining unit 1005 can be configured to obtain results of the terminal device grouping, which results are determined for data transmission based on the terminal device information. A plurality of data streams for the terminal devices within the same group are multiplexed by the multiple access in mode domain. The obtaining unit 1005 can be further configured to obtain at least one of the terminal device regrouping result, the resource reallocation result, and the updated data detecting scheme, where the at least one of the terminal device regrouping result, the resource reallocation result, and the updated data detecting scheme are determined based on the detection information of the data transmission. The data detection scheme is used by the electronic device to decode the received data based on a serial detection algorithm.

It is to be noted that, according to an embodiment herein, at least one of the foregoing terminal device grouping result and the terminal device re-grouping result, the resource re-allocation result, and the updated data detecting solution can be generated by the electronic device 200 according to embodiments as described above. In an example, the obtaining unit 1005 can obtain these results from the base station.

Further, in an example, the obtaining unit 1005 can be further configured to obtain an initial data detection scheme from the base station. The base station determines the data detection scheme by classifying the terminal devices within the group into levels, such that at least one level includes two or more terminal devices. Different levels of terminal devices are detected by a serial detection algorithm, and two or more terminal devices in the same level are detected by a parallel detection algorithm.

In an example, the obtaining unit 1005 can be further configured to obtain an initial resource allocation result within the group from the base station, wherein the resource allocation result makes overlap between resources for data streams for terminal devices within the same level as few as possible.

According to further embodiments, the electronic device 1000 can further comprise a reporting unit 1015. The reporting unit 1015 can be configured to report detection information to the base station, for the base station to perform at least one of terminal device re-grouping, resource reallocation within the group, and data detection scheme update. As described above, the detection information can include detection error information (the bit error rate or retransmission rate) and detection complexity information.

According to an embodiment herein, the electronic device 1000 can determine the detection information in the following exemplary manner. In an embodiment, the base station can transmit a dedicated reference signal or pilot or any known sequence to the electronic device 1000. The reference signal or pilot or other sequence is known to the electronic device 1000, so the electronic device 1000 can determine the detection error information after receiving and detecting it. In an example, the reference signal or pilot or any known sequence can be the same for each terminal device. In another embodiment, the electronic device 1000 can determine the detection information based on the actual downlink data transmission, such as by making estimation based on the channel coding and decoding. In actual downlink data transmission, the electronic device 1000 can perform channel decoding. Since the channel coding and decoding can detect or correct erroneous bits, the electronic device 1000 can estimate error of the data detection. Specifically, for error detection codes, such as a parity check code, a cyclic redundancy code, or the like, the number of bits in which an error occurs can be detected to determine a detection error; for error correction codes, such as an LDPC or a Turbo code, inputs to and outputs from channel decoding can be compared to obtain the number of error bits that have been corrected, thereby estimating the error of data detection. In both embodiments, the electronic device 1000 can further determine detection complexity information, such as represented by a detection delay.

It is to be noted that the reporting unit 1015 can be configured to report detection information to the base station on a periodic basis or based on some trigger condition, or both. For the periodic report, the reporting unit 1015 can feed back the detection information to the base station every certain period, and the period can be a fixed value, for example, 10 ms. In the SCMA system, the period can be related to the validity period of the mapping matrix or the constellation, for example, the period is ¼ of the validity period of the mapping matrix or the constellation, or the like. For reporting based on trigger conditions, the reporting unit 1015 can, for example, feed back detection error to the base station when the bit error rate exceeds a certain threshold (e.g., $10^{-3}$).

According to an embodiment, the reporting unit 1015 can be further configured to report the decoding capability of the terminal device to the base station. Regarding the decoding capability of the terminal device, reference can be made to the related description above, and will not be repeated here.

Figures 9, 10:
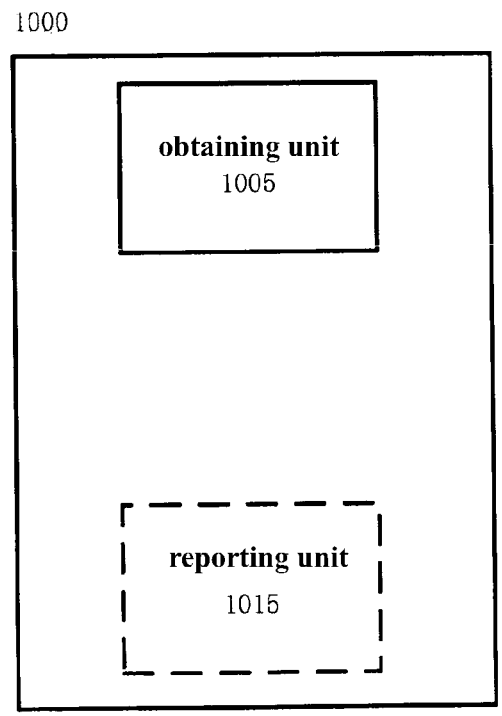
FIG. 9 illustrates an exemplary method for adjusting resource allocation within a group in accordance with an embodiment herein.
FIG. 10 illustrates another exemplary electronic device for a wireless communication system in accordance with an embodiment herein.

In an embodiment, the electronic device 1000 of FIG. 10 can be, for example, a terminal device or a portion thereof in FIGS. 1A and 1B. The electronic device 1000 can decode the received data based on at least one of the terminal device grouping result, the resource allocation result, and the data detection scheme. The electronic device 1000 can further decode the received data based on at least one of the terminal device re-grouping result, the resource reallocation result, and an updated data detection scheme. The electronic device 1000 can perform any of the operations performed by the terminal device in the foregoing embodiments. The electronic device 1000 can be configured to decode the data received from the base station based on at least one of the terminal device re-grouping result, the resource reallocation result, and the updated data detection scheme.

One or more of the obtaining unit 1005 and the reporting unit 1015 can be implemented by a processing circuit. Here, a processing circuit can refer to various implementations of digital circuitry, analog circuitry, or mixed signal (combination of analog and digital) circuitry that perform functions in a computing system. The processing circuits can include, for example, circuits such as integrated circuits (ICs), ASICs (application specific integrated circuits), portions or circuits of individual processor cores, entire processor cores, separate processors, programmable hardware devices such as field programmable gate arrays (FPGAs), and/or a system including multiple processors.

It is to be noted that the electronic device 1000 can be implemented at the chip level or can be implemented at the device level by including other external components. For example, the electronic device 1000 can alone operate as a communication device.

It is to be noted that the various elements described above are merely logical functional blocks that are divided according to the specific functions they achieve, and are not intended to limit the particular implementation. In implementation, each of the above functional units can be implemented as separate physical entities, or can be implemented as a single entity (e.g., a processor (CPU or DSP, etc.), an integrated circuit, etc.).

Embodiments herein further relates to yet another electronic device for a wireless communication system that can be used for uplink data transmission in a mode domain multiple access system (at this time, the electronic device can further be configured with downlink data transmission function). According to an embodiment, the electronic device can be configured to obtain the resource allocation result and the resource reallocation result, in order to perform uplink data transmission on the corresponding transmission resource.

Figure 11A:
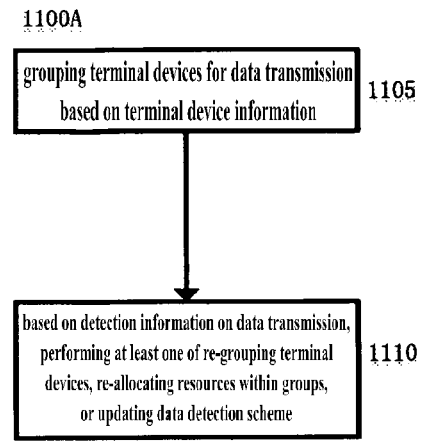
FIG. 11A illustrates an exemplary method for communication in accordance with an embodiment herein.

FIG. 11A illustrates an exemplary method for communication in accordance with an embodiment herein. As shown in FIG. 11A, the method 1100A can include grouping the terminal devices for data transmission based on terminal device information (block 1105), wherein resources are multiplexed by a plurality of data streams for terminal devices in the same group through multiple access in mode domain. The method 1100A further includes performing at least one of terminal device re-grouping, resource reallocation within the group, and data detection scheme update based on the detected information of the data transmission (block 1110), wherein the data detection scheme is used for decoding the received data based on the serial detection algorithm. Detailed exemplary operations of the method can refer to the above description of operations and functions performed by the electronic device 200, and are not repeated here.

Figure 11B:
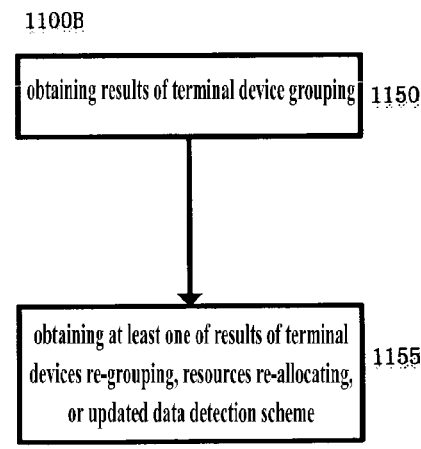
FIG. 11B illustrates another exemplary method for communication in accordance with an embodiment herein.

FIG. 11B illustrates another exemplary method for communication in accordance with an embodiment herein. As shown in FIG. 11B the method 1100B can include obtaining results of terminal device grouping (block 1150), the results of the terminal device grouping is determined for data transmission based on terminal device information, wherein resources are multiplexed by a plurality of data streams for the terminal devices in a same group through multiple access in mode domain. The method 1100B can further include obtaining at least one of results of terminal device re-grouping, results of resource re-allocation, and an updated data detection scheme (block 1155), wherein the at least one of results of the terminal device re-grouping, results of the resource re-allocation, and the updated data detection scheme is determined based on detection information on the data transmission, wherein the data detection scheme is used for decoding received data by the electronic device based on serial detection algorithms. Detailed exemplary operations of the method can refer to the above description of operations and functions performed by the electronic device 1000, and are not repeated here.

In order to facilitate understanding of the various operations described above in accordance with embodiments herein, the signaling interaction process between the base station and the terminal device will be described below with reference to FIGS. 12A and 12B.

Figure 12A:
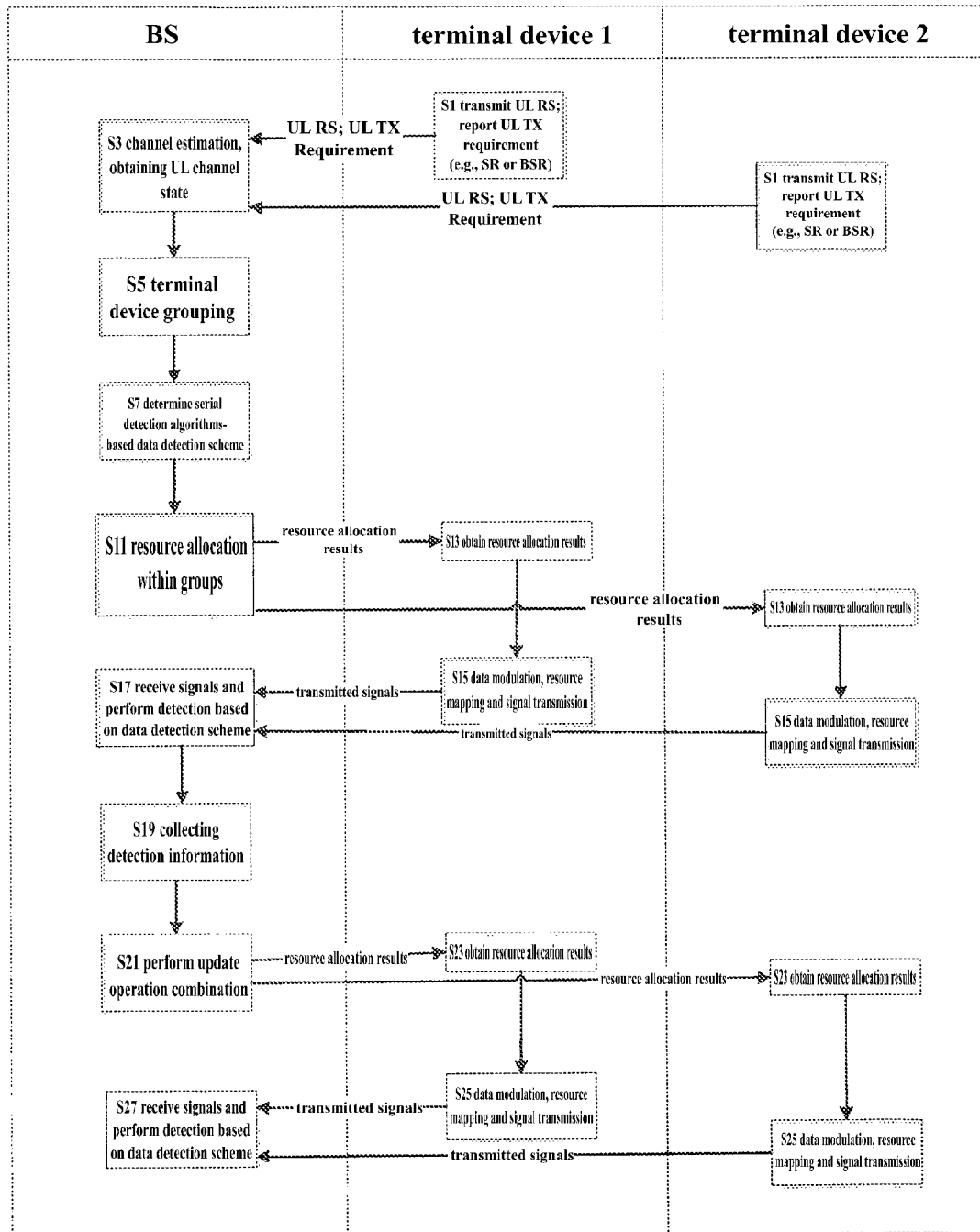
FIG. 12A illustrates an exemplary signaling interaction between a base station and a terminal device for uplink data transmission, in accordance with an embodiment herein.

FIG. 12A illustrates an exemplary signaling interaction process between a base station and a terminal device for uplink data transmission, in accordance with an embodiment herein. Specifically, at S1, each terminal device can be configured to transmit an uplink reference signal to the base station, and can further be configured to report an uplink transmission requirement to the base station, for example, in the form of a scheduling request (SR) or a buffer status report (BSR). Accordingly, at S3, the base station can be configured to receive an uplink reference signal and an uplink transmission requirement from each terminal device, and perform channel estimation based on the received uplink reference signal, thereby obtaining channel state information in uplink of each terminal device. At S5, the base station can be configured to perform terminal device grouping for uplink data transmission based on terminal device information (e.g., uplink channel state information). At S7, the base station can be configured to determine a data detection scheme for uplink data transmission; the data detection scheme can be not limited to the detection schemes described herein, and in one example, the data detection scheme can be data detection schemes based on serial detection algorithms in accordance with an embodiment herein. At S11, the base station can be configured to perform resource allocation within the group and notify each terminal device of the resource allocation result: the base station can perform any form of resource allocation within the group at S11, for example, resource allocation according to the embodiments herein. The resource allocation result herein can include information that facilitates the terminal device to perform uplink data transmission. In the example using SCMA, the resource allocation result here includes the mapping matrix V and the constellation for the target terminal device. At S13, each terminal device can be configured to obtain corresponding resource allocation results in order to transmit uplink data.

Subsequently, at S15, each terminal device can be configured to perform data modulation, perform resource mapping based on resource allocation results, and perform signal transmission. Next, at S17, the base station can be configured to receive signals from the respective terminal devices and perform data decoding based on the data detection scheme of S7. At S19, the base station can be configured to locally collect uplink detection information (e.g., including detection error and detection complexity, etc.) for uplink data transmission. At S21, the base station can be configured to perform an appropriate update operation combination (e.g., the update operation combinations a to c and b') according to the detection information or based on periodicity, and notify each terminal device of the resource allocation result again in the case where resource reallocation within the group is performed. At S23 and S25, each terminal device can be configured to obtain respective resource allocation results, perform data modulation, perform resource mapping based on resource allocation results, and perform signal transmission. Thereafter, at S27, the base station can be configured to receive signals from the respective terminal devices and perform data decoding based on the updated data detection scheme of S21. Thereafter, the base station and each terminal device can be configured to perform the processes of S19 to S27. The update operation combination performed in S21 can be any of the combinations a-c and b'. The resource allocation results herein can still include information that facilitates uplink data transmission by the terminal device. In the case of employing SCMA, in the case where any one of the combinations a-c is performed, the base station needs to notify the resource allocation result, that is, the updated mapping matrix V and the constellation. In the case where combination b' is performed, since no resource reallocation within the group occurs, no notification would be required (and S23 and subsequent operations are unnecessary). After S21, the base station only needs to perform detection and decoding in the updated order. It would be appreciated that in an example, the base station can preferentially attempt the update operation combination b'; and attempt other update operation combinations only if the detection performance is not met. For example, in FIG. 8B, the update operation combination b' can be attempted prior to step 865.

It is to be understood that FIG. 12A is just an example of the signaling interaction process between the base station and the terminal device for uplink data transmission, and those skilled in the art can conceive other examples within scope of the present disclosure, such as by adding other known operations, combining or cancelling operations in FIG. 12A, or performing the operations in different orders.

Figure 12B:
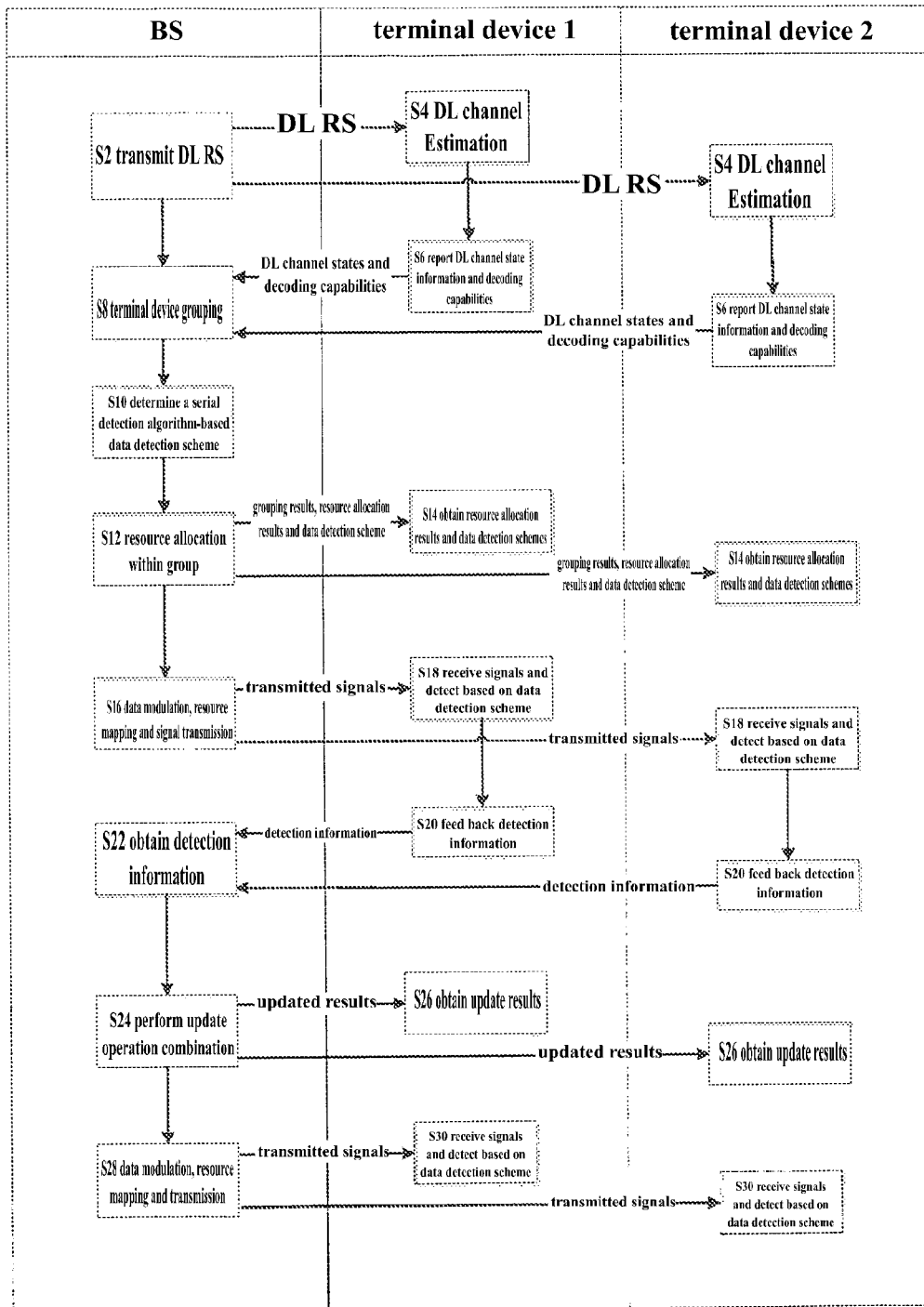
FIG. 12B illustrates an exemplary signaling interaction between a base station and a terminal device for downlink data transmission, in accordance with an embodiment herein.

FIG. 12B illustrates an exemplary signaling interaction process between a base station and a terminal device for downlink data transmission, in accordance with an embodiment herein. Specifically, at S2, the base station can be configured to transmit a downlink reference signal to respective terminal device. Accordingly, at S4, each terminal device can be configured to receive the downlink reference signal from the base station and perform channel estimation based on the received downlink reference signal, to obtain respective downlink channel state information. At S6, each terminal device can be configured to report downlink channel state information and respective decoding capabilities to the base station. At S8, the base station can be configured to perform terminal device grouping for downlink data transmission based on terminal device information (e.g., the downlink channel state information). At S10, the base station can be configured to determine a data detection scheme for downlink data transmission: the data detection scheme are not limited to the detection schemes described herein, and in an example, the data detection scheme can be the data detection scheme based on serial detection algorithm in accordance with an embodiment herein. At S12, the base station can be configured to perform resource allocation within the group and notify each terminal device of the resource allocation result and the data detection scheme. The notification in S12 can include necessary information necessary for the target terminal device to detect the transmitted data. For example, the notification to the target terminal device can include at least the level of the target terminal device and the resource allocation results for the terminal device in previous levels within the same group, that is, the resource allocation results for the terminal devices in the subsequent levels are not notified, thereby reducing the signaling consumption. In the case of SCMA decoding using the detection scheme of FIG. 5B or FIG. 5C, the notification to the target terminal device can include just the factor graph matrix F and the constellation of the terminal devices in the SIC level of the target terminal device and in the previous levels, SIC levels classifying, the mapping matrix V (corresponding to a certain column in F) and the constellation of the target terminal device itself, wherein the SIC level of the target terminal device itself can be implicitly notified, that is, it is the last level in the notification. Compared with the MPA decoding of the conventional SCMA, the above method reduces the signaling consumption because the resource allocation results of the terminal devices in subsequent levels are not notified. Of course, in order to facilitate the adjustment after the subsequent update operations, the factor graph matrix F and the constellation of all terminals within the entire group and the SIC level of the target terminal can be notified to the target terminal device. The base station can perform any form of resource allocation within the group in S12. In an example, the base station can perform the resource allocation within the scope in accordance with an embodiment herein at S12. At S14, each terminal device can be configured to obtain respective resource allocation results and data detection schemes, in order to receive and decode downlink data.

Subsequently, at S16, the base station can be configured to perform data modulation, perform resource mapping based on resource allocation results, and perform signal transmission. Next, at S18, each terminal device can be configured to receive a signal from the base station and perform data decoding based on the data detection scheme of S10. At S20, each terminal device can be configured to feed back downlink detection information (e.g., including detection error and detection complexity, etc.) to the base station. Accordingly, at S22, the base station can be configured to collect downlink detection information from each terminal device. At S24, the base station can be configured to perform an appropriate update operation combination (e.g., the update operation combinations a-c) based on the detection information or based on periodicity, and notify the respective terminal devices of the update results after perform corresponding update operations (e.g., at least one of terminal device re-grouping, re-allocating resources within the group, and updating the data detection schemes. Similar to S12, the notification in S24 can include the necessary update information required for the target terminal device to detect the transmitted data. For example, the notification to the target terminal device can include at least the level of the target terminal device and the resource allocation results for the terminal devices in previous levels within the same group, that is, the resource allocation results for the terminal devices in the subsequent levels are not notified, thereby reducing the signaling consumption. In the case of SCMA decoding using the detection scheme of FIG. 5B or FIG. 5C, in the case of performing the update operation combination a, the notification can include the factor graph matrix F and the constellation of the terminal devices in the SIC level of the target terminal device and in the previous levels. At this time, since the levels are not updated, the columns in the factor map F for respective terminal devices do not change. In the case where the update operation combinations b or c is performed, content of the notification can be the same as that of S12. In the case where the update operation combination b' is performed, it is necessary to notify the updated for the target terminal. At S26, each terminal device can be configured to obtain the update result. At S28, the base station can be configured to perform data modulation, perform resource mapping based on the resource allocation result (result updated at S24, if the resource allocation is updated at S24; otherwise the result determined at S12) and signal transmission. Thereafter, at S30, each terminal device can be configured to receive a signal from the base station and perform data decoding based on the data detection scheme (as updated at S24, if resource allocation is updated at S24; otherwise the scheme determined at S10). Thereafter, the base station and each terminal device can be configured to perform the processes of S20 to S30.

It is to be understood that FIG. 12B is just an example of the signaling interaction process between the base station and the terminal device for downlink data transmission, and those skilled in the art can conceive other examples within scope of the present disclosure, such as by adding other known operations, combining or cancelling operations in FIG. 12B, or performing the operations in different orders.

As can be seen in the examples of FIGS. 12A and 12B, in the uplink and downlink data transmission, there can be differences in the signaling interaction process between the base station and the terminal device. The differences mainly lie in that, for downlink data transmission, since data detection is performed by each terminal device, on the one hand, the base station needs to notify each terminal device of information necessary for data detection (e.g., terminal device grouping, resource allocation for other terminal devices required for the target terminal device's decoding operation, and the data detection scheme) after this information is determined; on the other hand, in order to enable the base station to perform an appropriate determination/update operation, each terminal device needs to report its decoding capability and downlink detection information to the base station.

Various aspects of embodiments herein are described in detail above in the context of a cellular communication architecture with reference to FIGS. 1A-12B. However, the inventive concept of the present disclosure is not limited to application in the cellular communication architecture. For example, the inventive concept can be applied in a cognitive radio system, as described in detail below.

Generally, a cognitive radio system includes, for example, a primary system and a secondary system. The primary system is a system with legitimate spectrum usage rights, such as a radar system. There can be multiple users in the primary system, namely the primary users. The secondary system can be a system without spectrum usage rights and can only properly use the spectrum for communication when the primary system does not use the spectrum, such as a civil communication system. There can be multiple users in the secondary system, namely the secondary users. Alternatively, the secondary system can be a system with spectrum usage rights, but with a lower priority level in spectrum usage than the primary system. For example, in the case where an operator deploys new base stations to provide a new service, the services already provided by the existing base stations are used as the primary system with spectrum usage priority. In another alternative example, there can be no primary system, and each secondary system has only opportunistic usage rights for a particular spectrum. For example, some spectrum resources that have not been specified by regulations to a certain type of communication system can be used as unlicensed spectrum for various communication systems that can be used opportunistically.

The coexistence of the primary and secondary systems requires that the communication of the secondary system does not adversely affect the communication of the primary system, or the affect of the spectrum utilization by the secondary system can be controlled within the tolerance allowable for the primary system (i.e., not exceeding its interference threshold). In the case where the interference to the primary system is guaranteed to be within a certain range, the resources available to the primary system can be allocated to multiple secondary systems.

One of the most important manners to protect the primary system is to store the coverage information of the primary system in the database. This database also stores the interference tolerance allowable by the primary system. Before starting to utilize the spectrum of the primary system in a same area, the secondary system in the same area first accesses the database and submits the status information of the secondary system, such as location information, spectrum emission mask, transmission bandwidth and carrier frequency, and the like. Then, the database calculates the amount of interference of the secondary system to the primary system according to the state information of the secondary system, and calculates the estimated available spectrum resources to the secondary system in current state according to the calculated amount of interference of the secondary system to the primary system in the current state.

A spectrum coordinator can be disposed between the database and the secondary system for coordinating the utilization of the estimated available spectrum resources by multiple secondary systems, in order to optimize the spectrum use efficiency and avoid interference between the secondary systems. Depending on the system design, both the database and the spectrum coordinator can be implemented by a single entity. It can be understood that in an example without the primary system, the database can be omitted and only the spectrum coordinator can be configured.

In an example, when there are communication between multiple secondary user devices and one secondary user device in the secondary system (e.g., by device to device (D2D), vehicle to vehicle (V2V), etc.), the methods in accordance with the present disclosure can be applied to the communication from the multiple secondary user devices to the one secondary user device and/or from the one secondary user device to the multiple secondary user devices. In this example, the spectrum coordinator can control the data transmission of the secondary user devices, and perform operations associated with the group, resource allocation, and data detection schemes in accordance with the present disclosure. For example, the communication from the multiple secondary user devices to the one secondary user device can correspond to uplink data transmission, and the communication from the one secondary user device to the multiple secondary user devices can correspond to downlink data transmission. The multiple secondary user devices, as a whole, can utilize a range of unlicensed spectrum, and can be classified into multiple groups. A subset of the unlicensed spectrum can be allocated to each group, such that the unlicensed spectrum between different groups can be orthogonal. The group of unlicensed spectrum can be multiplexed by multiple secondary user devices within the same group by using the multiple access in mode domain (e.g., SCMA, PDMA) for communication, in order to improve spectrum utilization. In this example, the operations associated with the group, resource allocation, and data detection scheme according to the present disclosure can be implemented by the spectrum coordinator, which collects channel state information, detection information, and the like of the secondary user devices, and notifies to the secondary user devices of the corresponding processing result. In this sense, the spectrum coordinator can implement some of the functions of the above base station, but the spectrum coordinator does not serve as a sender or receiver of data transmission, but only implements the control function. In the sense of serving as the sender or receiver of the data transmission and detecting the data for the multiple secondary user devices, the multiple secondary user devices can correspond to the terminal devices, and one of the secondary user devices can correspond to the above base station, and all of them need to report channel state information, detection information, and the like to the spectrum coordinator, such that the spectrum coordinator can implement its control function.

Figure 13:
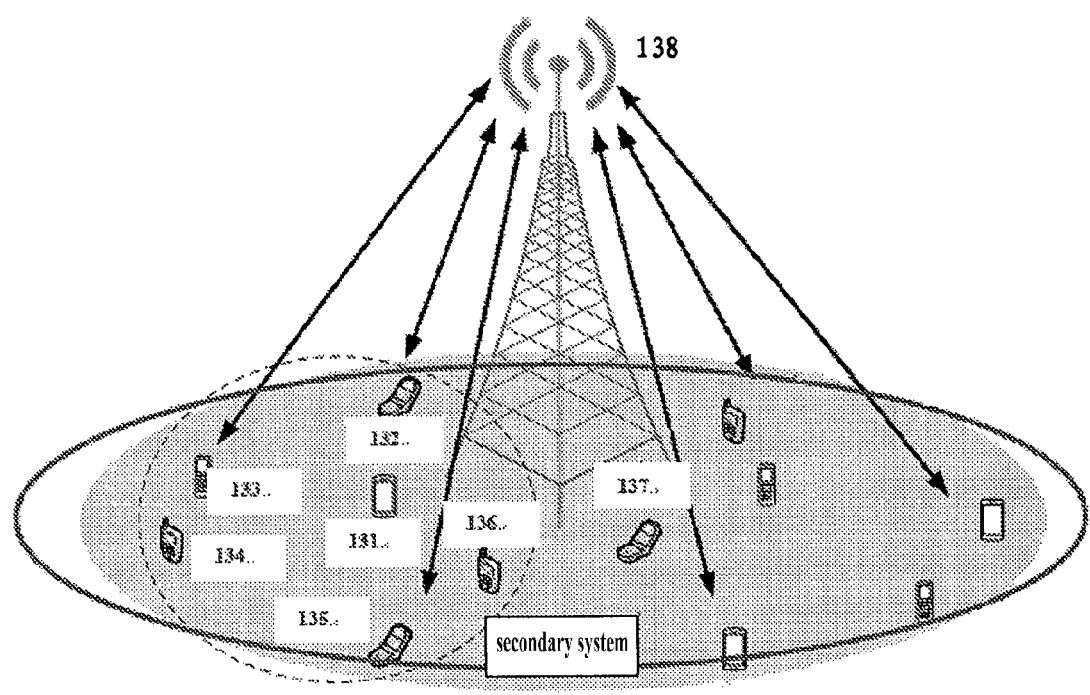
FIG. 13 illustrates an example of applying the methods herein to a cognitive radio communication scenario.

In an example, each terminal device in the cellular communication system can operate as a secondary user to form a secondary system, in order for opportunistic use of unlicensed spectrum or spectrum the terminal device has lower priority to use, for example. Then, the database and the spectrum coordinator can be implemented by the base station. FIG. 13 illustrates an example of how the method of the present disclosure is applied to the cognitive radio communication scenario. In the example of FIG. 13, the terminal devices can communicate by e.g., D2D, and the terminal devices 131 to 136 have a common communication object, that is, the terminal device 137. Accordingly, there can be data transmission from the terminal devices 131 to 136 to the terminal device 137 and/or data transmission from the terminal device 137 to the terminal devices 131 to 136. Here, the communication of the terminal devices 131 to 136 to the terminal device 137 can correspond to uplink data transmission, and the communication of the terminal device 137 to the terminal devices 131 to 136 can correspond to downlink data transmission. The multiple terminal devices, as a whole, can utilize a range of unlicensed spectrum or spectrum the terminal devices have lower priority to use, and can be classified into multiple groups. A subset of the spectrum can be allocated to each group, such that the spectrum between different groups can be orthogonal. The group of unlicensed spectrum can be multiplexed by the multiple secondary user devices within the same group by using the multiple access in mode domain (e.g., SCMA, PDMA) for communication. In this example, the operations associated with the group, resource allocation, and data detection scheme according to the present disclosure can be implemented by the base station 138 which serves as the spectrum coordinator, and the base station 138 collects channel state information, detection information, and the like, of the terminal device, and notify the terminal devices of the corresponding processing results. The base station 138 here has something in common with the above base stations (e.g., 105) that they both implement control functions, however the base station 138 is neither the sender nor receiver of data transmission. In the sense of serving as the sender or receiver of the data transmission and detecting the data for the multiple terminal devices, the terminal devices 131-136 can correspond to the above terminal devices, wherein the terminal devices 137 can correspond to the above base station 105, it is necessary for them all to report channel state information, detection information, and the like, to the base station 138.

In other examples, the methods of the present disclosure can be applied to cognitive radio systems such as systems conforming to the IEEE P802.19.1a standard and the Spectrum Access System (SAS). When obtaining the teachings of the present disclosure, those skilled in the art can readily use the operations associated with the grouping, resource allocation, and data detection schemes of the present disclosure in conjunction with such cognitive radio systems without departing from the scope of the present disclosure. For example, the function entity for the group and resource allocation in the base station in the present disclosure can be implemented as a coexistence manager (CM) in the IEEE P802.19.1a standard, and the function entity for data transmission and detection in the terminal device or the base station in the present disclosure can be implemented as the Geolocation Capability Object (GCO) in the IEEE P802.19.1a standard. For example, the function entity for the group and resource allocation in the base station in the present disclosure can be implemented as a SAS resource management entity in the SAS system, and the function entity for data transmission and detection in the terminal device or the base station in the present disclosure can be implemented as Citizens Broadband Radio Service Device (CBSD) in the SAS system. It should be understood that the machine-executable instructions in the storage medium and the program product according to the embodiments herein can also be configured to perform the methods corresponding to the apparatus embodiment described above, and thus the content not described in detail herein can be referred to the description in the previous corresponding positions, thus the description thereof will not be repeated herein.

Accordingly, a storage medium for carrying the above-described program product including machine executable instructions is also included in the disclosure of the present invention. The storage medium includes, but is not limited to, a floppy disk, an optical disk, a magneto-optical disk, a memory card, a memory stick, and the like.

Figure 14:
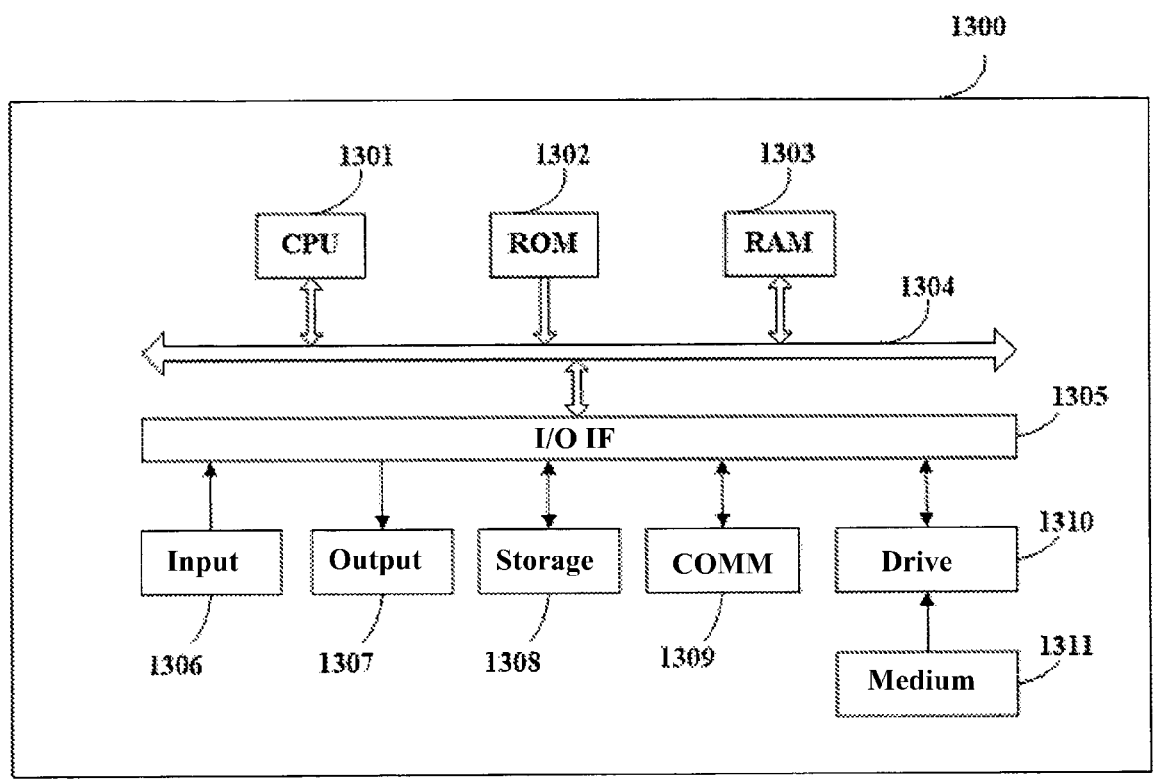
FIG. 14 is a block diagram of example structure of a personal computer which is an information processing device that can be employed in an embodiment herein.

In addition, it should also be noted that the above series of processes and devices can also be implemented by software and/or firmware. In the case of being implemented by software and/or firmware, a program constituting the software is installed from a storage medium or a network to a computer having a dedicated hardware structure, such as the general-purpose personal computer 1300 shown in FIG. 14, which, when is installed with various programs, can execute various functions and so on. FIG. 14 is a block diagram showing an example structure of a personal computer which can be employed as an information processing device in the embodiment herein.

In FIG. 14, a central processing unit (CPU) 1301 executes various processes in accordance with a program stored in a read-only memory (ROM) 1302 or a program loaded from a storage 1308 to a random access memory (RAM) 1303. In the RAM 1303, data required when the CPU 1301 executes various processes and the like is also stored as needed.

The CPU 1301, the ROM 1302, and the RAM 1303 are connected to each other via a bus 1304. Input/output interface 1305 is also connected to bus 1304.

The following components are connected to the input/output interface 1305: an input unit 1306 including a keyboard, a mouse, etc.: an output unit 1307 including a display such as a cathode ray tube (CRT), a liquid crystal display (LCD), etc., and a speaker, etc.: the storage 1308 including a hard disk etc.: and a communication unit 1309 including a network interface card such as a LAN card, a modem, etc., The communication unit 1309 performs communication processing via a network such as the Internet.

A driver 1310 is also connected to the input/output interface 1305 as needed. A removable medium 1311 such as a magnetic disk, an optical disk, a magneto-optical disk, a semiconductor memory or the like is mounted on the drive 1310 as needed, so that a computer program read therefrom is installed into the storage 1308 as needed.

In the case where the above-described series of processing is implemented by software, a program constituting the software is installed from a network such as the Internet or a storage medium such as the removable medium 1311.

It will be understood by those skilled in the art that such a storage medium is not limited to the removable medium 1311 shown in FIG. 24 in which a program is stored and distributed separately from the device to provide a program to the user. Examples of the removable medium 1311 include a magnetic disk (including a floppy disk (registered trademark)), an optical disk (including a compact disk read only memory (CD-ROM) and a digital versatile disk (DVD)), a magneto-optical disk (including a mini disk (MD) (registered trademark)) and a semiconductor memory. Alternatively, the storage medium may be a ROM 1302, a hard disk included in the storage section 1308, or the like, in which programs are stored, and distributed to users together with the device containing them.

The technology of the present disclosure can be applied to various products. For example, the base stations mentioned in this disclosure can be implemented as any type of evolved Node B (eNB), such as a macro eNB and a small eNB. The small eNB can be an eNB covering a cell smaller than the macro cell, such as a pico eNB, a micro eNB, and a home (femto) eNB. Alternatively, the base station can be implemented as any other type of base station, such as a NodeB and a Base Transceiver Station (BTS). The base station can include: a body (also referred to as a base station device) configured to control radio communication: and one or more remote radio heads (RRHs) disposed at a different location from the body. In addition, various types of terminals which will be described below can each operate as a base station by performing base station functions temporarily or semi-persistently.

For example, the terminal device mentioned in the present disclosure, also referred to as a user device in some examples, can be implemented as a mobile terminal (such as a smartphone, a tablet personal computer (PC), a notebook PC, a portable game terminal, a portable/dongle type mobile router and digital camera) or in-vehicle terminal (such as car navigation device). The user device may also be implemented as a terminal that performs machine-to-machine (M2M) communication (also referred to as a machine type communication (MTC) terminal). Further, the user device may be a radio communication module (such as an integrated circuit module including a single wafer) installed on each of the above terminals.

Use cases according to the present disclosure will be described below with reference to FIGS. 15 to 18.

[Use Cases for Base Stations]

It should be understood that the term base station in this disclosure has the full breadth of its ordinary meaning, and includes at least a radio communication station used as portion of a wireless communication system or radio system to facilitate communication. Examples of the base station can be, for example but not limited to, the following: the base station can be either or both of a base transceiver station (BTS) and a base station controller (BSC) in the GSM system, and can be either or both of a radio network controller (RNC) or Node B in the WCDMA system, can be eNB in the LTE and LTE-Advanced system, or can be corresponding network nodes in future communication systems (e.g., the gNB that can appear in the 5G communication systems etc.). Some of the functions in the base station of the present disclosure can also be implemented as an entity having a control function for communication in the scenario of a D2D, M2M, and V2V communication, or as an entity that plays a spectrum coordination role in the scenario of a cognitive radio communication.

First Use Case

Figure 15:
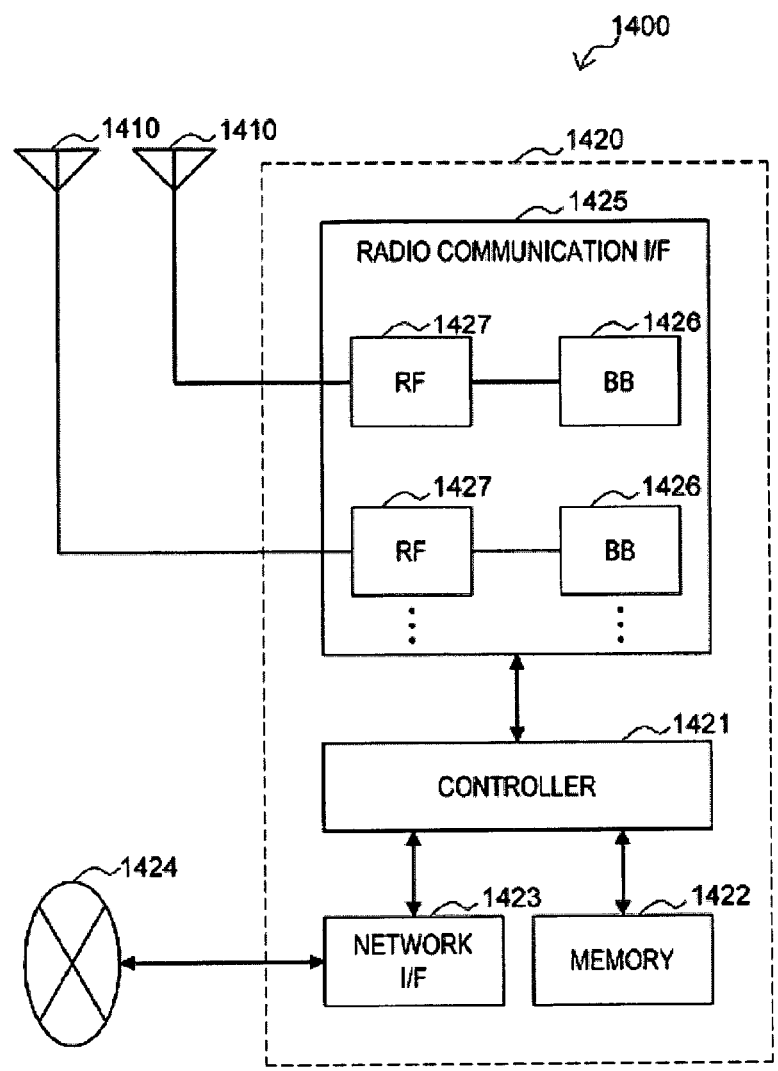
FIG. 15 is a block diagram illustrating a first example of a schematic configuration of an eNodeB (eNB) to which the technology of the present disclosure can be applied.

FIG. 15 is a block diagram illustrating a first example of a schematic configuration of a eNB to which the technology of the present disclosure can be applied. The eNB 1400 includes a plurality of antennas 1410 and a base station device 1420. The base station device 1420 and each antenna 1410 may be connected to each other via an RF cable. In one implementation, the eNB 1400 (or base station device 1420) herein may correspond to the electronic device 200 described above.

Each of the antennas 1410 includes a single or multiple antenna elements (such as multiple antenna elements included in a Multiple Input and Multiple Output (MIMO) antenna), and is used for the base station device 1420 to transmit and receive radio signals. As shown in FIG. 15, the eNB 1400X) may include multiple antennas 1410. For example, multiple antennas 1410 may be compatible with multiple frequency bands used by the gNB 1400.

The base station device 1420 includes a controller 1421, a memory 1422, a network interface 1423, and a radio communication interface 1425.

The controller 1421 may be, for example, a CPU or a DSP, and operates various functions of higher layers of the base station device 1420. For example, controller 1421 generates data packets from data in signals processed by the radio communication interface 1425, and transfers the generated packets via network interface 1423. The controller 1421 can bundle data from multiple base band processors to generate the bundled packets, and transfer the generated bundled packets. The controller 1421 may have logic functions of performing control such as radio resource control, radio bearer control, mobility management, admission control, and scheduling. This control may be performed in corporation with a eNB or a core network node in the vicinity. The memory 1422 includes RAM and ROM, and stores a program that is executed by the controller 1421 and various types of control data such as a terminal list, transmission power data, and scheduling data.

The network interface 1423 is a communication interface for connecting the base station device 1420 to the core network 1424. Controller 1421 may communicate with a core network node or another eNB via the network interface 1423. In this case, the eNB 1400 and the core network node or other eNBs may be connected to each other through a logical interface such as an S1 interface and an X2 interface. The network interface 1423 may also be a wired communication interface or a radio communication interface for radio backhaul lines. If the network interface 1423 is a radio communication interface, the network interface 1423 may use a higher frequency band for radio communication than a frequency band used by the radio communication interface 1425.

The radio communication interface 1425 supports any cellular communication schemes, such as Long Term Evolution (LTE) and LTE-Advanced, and provides radio connection to a terminal positioned in a cell of the eNB 1400 via the antenna 1410. Radio communication interface 1425 may typically include, for example, a baseband (BB) processor 1426 and a RF circuit 1427. The BB processor 1426 may perform, for example, encoding/decoding, modulation/demodulation, and multiplexing/demultiplexing, and performs various types of signal processing of layers such as L1, Medium Access Control (MAC), Radio Link Control (RLC), and Packet Data Convergence Protocol (PDCP). Instead of controller 1421, the BB processor 1426 may have a part or all of the above-described logic functions. The BB processor 1426 may be a memory that stores a communication control program, or a module that includes a processor configured to execute the program and a related circuit. Updating the program may allow the functions of the BB processor 1426 to be changed. The module may be a card or a blade that is inserted into a slot of the base station device 1420. Alternatively, the module may also be a chip that is mounted on the card or the blade. Meanwhile, the RF circuit 1427 may include, for example, a mixer, a filter, and an amplifier, and transmits and receives radio signals via the antenna 1410. Although FIG. 25 illustrates an example in which one RF circuit 1427 is connected to one antenna 1410, the present disclosure is not limited to thereto: rather, one RF circuit 1427 may connect to a plurality of antennas 1410 at the same time.

As illustrated in FIG. 15, the radio communication interface 1425 may include the multiple BB processors 1426. For example, the multiple BB processors 1426 may be compatible with multiple frequency bands used by eNB 1400. As illustrated in FIG. 15, the radio communication interface 1425 may include the multiple RF circuits 1427. For example, the multiple RF circuits 1427 may be compatible with multiple antenna elements. Although FIG. 15 illustrates the example in which the radio communication interface 1425 includes the multiple BB processors 1426 and the multiple RF circuits 1427, the radio communication interface 1425 may also include a single BB processor 1426 or a single RF circuit 1427.

Second Use Case

Figure 16:
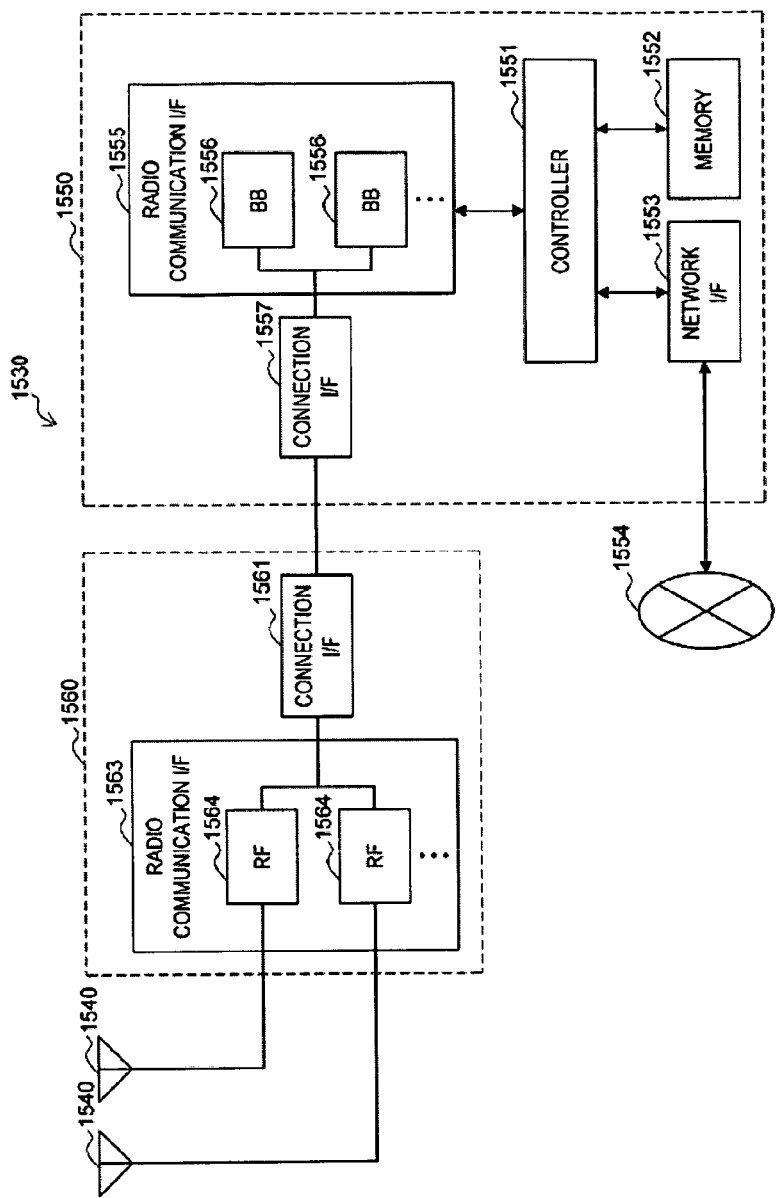
FIG. 16 is a block diagram illustrating a second example of a schematic configuration of an eNB to which the technology of the present disclosure can be applied.

FIG. 16 is a block diagram illustrating a second example of a schematic configuration of a eNB to which the technology of the present disclosure may be applied. The eNB 1530 includes a plurality of antennas 1540, a base station device 1550, and an RRH 1560. The RRH 1560 and each antenna 1540 may be connected to each other via an RF cable. The base station device 1550 and the RRH 1560 may be connected to each other via a high speed line such as a fiber optic cable. In one implementation, the eNB 1530 (or base station device 1550) herein may correspond to the electronic device 200 described above.

Each of the antennas 1540 includes a single or multiple antenna elements such as multiple antenna elements included in a MIMO antenna and is used for the RRH 1560 to transmit and receive radio signals. The eNB 1530 may include multiple antennas 1540, as illustrated in FIG. 16. For example, multiple antennas 1540 may be compatible with multiple frequency bands used by the eNB 1530.

The base station device 1550 includes a controller 1551, a memory 1552, a network interface 1553, a radio communication interface 1555, and a connection interface 1557. The controller 1551, the memory 1552, and the network interface 1553 are the same as the controller 1421, the memory 1422, and the network interface 1423 described with reference to FIG. 15.

The radio communication interface 1555 supports any cellular communication scheme (such as LTE and LTE-Advanced) and provides radio communication to terminals positioned in a sector corresponding to the RRH 1560 via the RRH 1560 and the antenna 1540. The radio communication interface 1555 may typically include, for example, a BB processor 1556. The BB processor 1556 is the same as the BB processor 1426 described with reference to FIG. 15, except that the BB processor 1556 is connected to the RF circuit 1564 of the RRH 1560 via the connection interface 1557. The radio communication interface 1555 may include the multiple BB processors 1556, as illustrated in FIG. 16. For example, the multiple BB processors 1556 may be compatible with multiple frequency bands used by the eNB 1530. Although FIG. 16 illustrates the example in which the radio communication interface 1555 includes multiple BB processors 1556, the radio communication interface 1555 may also include a single BB processor 1556.

The connection interface 1557 is an interface for connecting the base station device 1550 (radio communication interface 1555) to the RRH 1560. The connection interface 1557 may also be a communication module for communication in the above-described high speed line that connects the base station device 1550 (radio communication interface 1555) to the RRH 1560.

The RRH 1560 includes a connection interface 1561 and a radio communication interface 1563.

The connection interface 1561 is an interface for connecting the RRH 1560 (radio communication interface 1563) to the base station device 1550. The connection interface 1561 may also be a communication module for communication in the above-described high speed line.

The radio communication interface 1563 transmits and receives radio signals via the antenna 1540. Radio communication interface 1563 may typically include, for example, the RF circuitry 1564. The RF circuit 1564 may include, for example, a mixer, a filter, and an amplifier, and transmits and receives radio signals via the antenna 1540. Although FIG. 16 illustrates the example in which one RF circuit 1564 is connected to one antenna 1540, the present disclosure is not limited to thereto: rather, one RF circuit 1564 may connect to a plurality of antennas 1540 at the same time.

The radio communication interface 1563 may include multiple RF circuits 1564, as illustrated in FIG. 16. For example, multiple RF circuits 1564 may support multiple antenna elements. Although FIG. 26 illustrates the example in which the radio communication interface 1563 includes the multiple RF circuits 1564, the radio communication interface 1563 may also include a single RF circuit 1564.

[Use Cases Related to User Devices]

First Use Case

Figure 17:
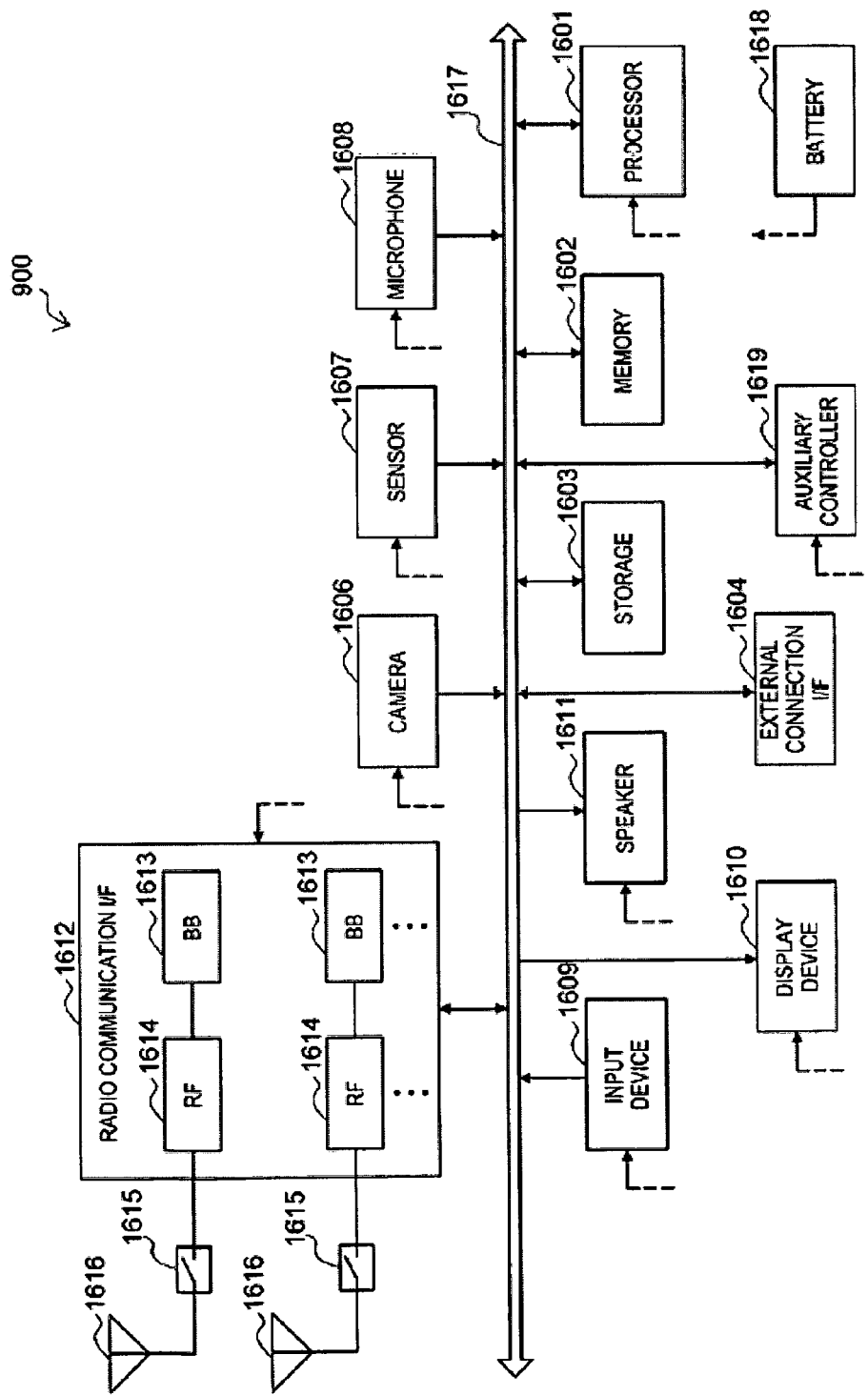
FIG. 17 is a block diagram illustrating an example of a schematic configuration of a smartphone to which the technology of the present disclosure can be applied.

FIG. 17 is a block diagram illustrating an example of a schematic configuration of a smartphone 1600 to which the technology of the present disclosure may be applied. The smartphone 1600 includes a processor 1601, a memory 1602, a storage 1603, an external connection interface 1604, an camera 1606, a sensor 1607, a microphone 1608, an input device 1609, a display device 1610, a speaker 1611, a radio communication interface 1612, one or more antenna switch 1615, one or more antennas 1616, a bus 1617, a battery 1618, and an auxiliary controller 1619. In one implementation, smartphone 1600 (or processor 1601) herein may correspond to the electronic device 1000 described above.

The processor 1601 may be, for example, a CPU or a system on chip (SoC), and controls functions of an application layer and the other layers of the smartphone 1600. The memory 1602 includes RAM and ROM, and stores a program that is executed by the processor 1601, and data. The storage 1603 may include a storage medium such as a semiconductor memory and a hard disk. The external connection interface 1604 is an interface for connecting an external device such as a memory card and a universal serial bus (USB) device to the smartphone 1600.

The camera 1606 includes an image sensor such as a charge coupled device (CCD) and a complementary metal oxide semiconductor (CMOS), and generates a captured image. Sensor 1607 may include a group of sensors such as a measurement sensor, a gyro sensor, a geomagnetic sensor, and an acceleration sensor. The microphone 1608 converts the sounds that are input to the smartphone 1600 to audio signals. The input device 1609 includes, for example, a touch sensor configured to detect touch on a screen of the display device 1610, a keypad, a keyboard, a button, or a switch, and receives an operation or an information input from a user. The display device 1610 includes a screen such as a liquid crystal display (LCD) and an organic light emitting diode (OLED) display, and displays an output image of the smartphone 1600. The speaker 1611 converts audio signals that are output from the smartphone 1600 to sounds.

The radio communication interface 1612 supports any cellular communication scheme such as LTE and LTE-Advanced, and performs radio communication. The radio communication interface 1612 may typically include, for example, a BB processor 1613 and an RF circuitry 1614. The BB processor 1613 may perform, for example, encoding/decoding, modulation/demodulation, and multiplexing/demultiplexing, and performs various types of signal processing for radio communication. Meanwhile, the RF circuit 1614 may include, for example, a mixer, a filter, and an amplifier, and transmits and receives radio signals via the antenna 1616. The radio communication interface 1612 may be a one chip module that integrates the BB processor 1613 and the RF circuit 1614 thereon. The radio communication interface 1612 may include multiple BB processors 1613 and multiple RF circuits 1614, as illustrated in FIG. 17. Although FIG. 17 illustrates the example in which the radio communication interface 1612 includes multiple BB processors 1613 and multiple RF circuits 1614, the radio communication interface 1612 may also include a single BB processor 1613 or a single RF circuit 1614.

Furthermore, in addition to a cellular communication scheme, the radio communication interface 1612 may support additional type of radio communication schemes, such as short-range wireless communication schemes, a near field communication schemes, and a wireless local area network (LAN) scheme. In this case, the radio communication interface 1612 may include the BB processor 1613 and the RF circuitry 1614 for each radio communication scheme.

Each of the antenna switches 1615 switches connection destinations of the antenna 1616 among multiple circuits (such as circuits for different radio communication schemes) included in the radio communication interface 1612.

Each of the antennas 1616 includes a single or multiple antenna elements (such as multiple antenna elements included in a MIMO antenna) and is used for the radio communication interface 1612 to transmit and receive radio signals. The smartphone 1600 may include multiple antennas 1616, as illustrated in FIG. 17. Although FIG. 17 illustrates the example in which the smartphone 1600 includes multiple antennas 1616, the smartphone 1600 may also include a single antenna 1616.

Furthermore, the smartphone 1600 may include the antenna 1616 for each radio communication scheme. In this case, the antenna switch 1615 may be omitted from the configuration of the smartphone 1600.

The bus 1617 connects the processor 1601, the memory 1602, the storage 1603, the external connection interface 1604, the camera 1606, the sensor 1607, the microphone 1608, the input device 1609, the display device 1610, the speaker 1611, the radio communication interface 1612, and the auxiliary control 1619 to each other. The battery 1618 supplies power to blocks of the smartphone 1600 illustrated in FIG. 17 via feeder lines, which are partially shown as a dashed line in the figure. The auxiliary controller 1619 operates a minimum necessary function of the smartphone 1600, for example, in a sleep mode.

Second Use Case

Figure 18:
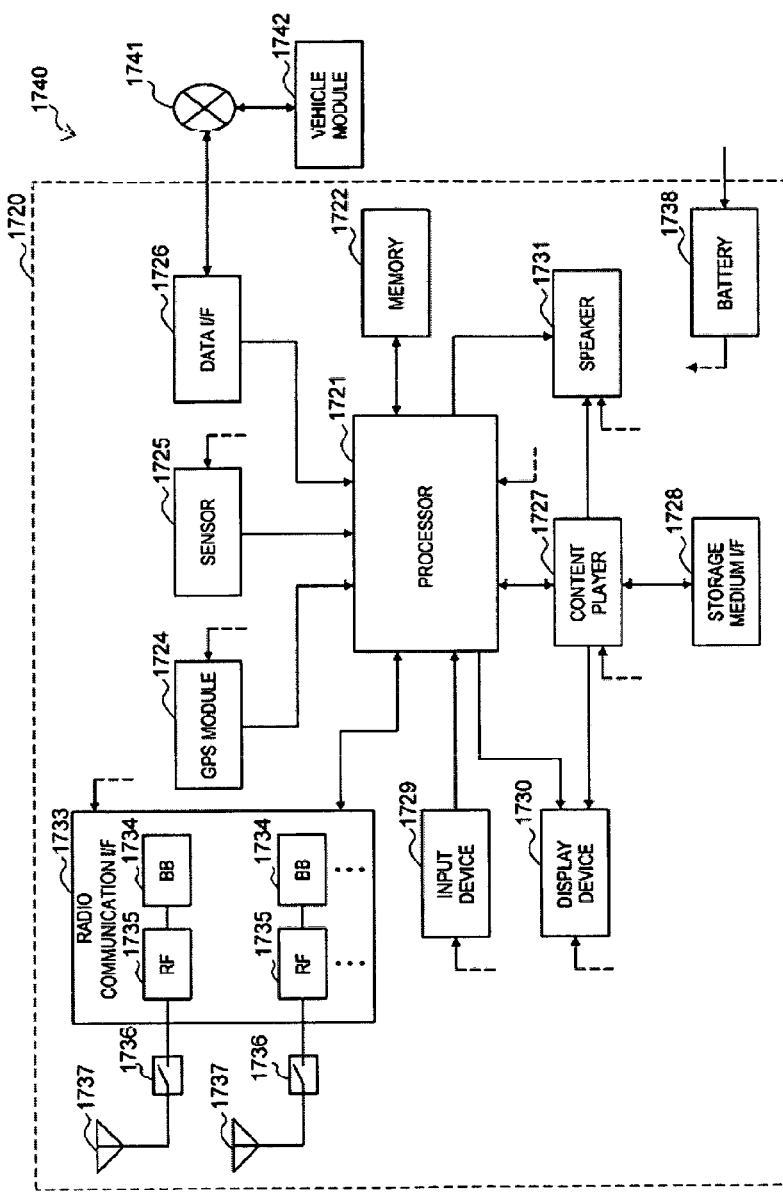
FIG. 18 is a block diagram illustrating an example of a schematic configuration of an automobile navigation device to which the technology of the present disclosure can be applied.

FIG. 18 is a block diagram illustrating an example of a schematic configuration of a car navigation device 1720 to which the technology of the present disclosure may be applied. The car navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, and a radio communication interface 1733, one or more antenna switches 1736, one or more antennas 1737, and a battery 1738. In one implementation, car navigation device 1720 (or processor 1721) herein may correspond to terminal device 1000 described above.

The processor 1721 may be, for example, a CPU or a SoC, and controls a navigation function and other functions of the car navigation device 1720. The memory 1722 includes RAM and ROM, and stores a program that is executed by the processor 1721, and data.

The GPS module 1724 uses GPS signals received from a GPS satellite to measure a position, such as latitude, longitude, and altitude, of the car navigation device 1720. Sensor 1725 may include a group of sensors such as a gyro sensor, a geomagnetic sensor, and an air pressure sensor. The data interface 1726 is connected to, for example, an in-vehicle network 1741 via a terminal not shown, and acquires data generated by the vehicle, such as vehicle speed data.

The content player 1727 reproduces content stored in a storage medium (such as a CD and a DVD) that is inserted into the storage medium interface 1728. The input device 1729 includes, for example, a touch sensor configured to detect touch on a screen of the display device 1730, a button, or a switch, and receives an operation or an information input from a user. The display device 1730 includes a screen such as an LCD or an OLED display, and displays an image of the navigation function or content that is reproduced. The speaker 1731 outputs sounds of the navigation function or the content that is reproduced.

The radio communication interface 1733 supports any cellular communication scheme, such as LTE and LTE-Advanced, and performs radio communication. The radio communication interface 1733 may typically include, for example, a BB processor 1734 and an RF circuit 1735. The BB processor 1734 may perform, for example, encoding/decoding, modulation/demodulation, and multiplexing/de-multiplexing, and performs various types of signal processing for radio communication. Meanwhile, the RF circuit 1735 may include, for example, a mixer, a filter, and an amplifier, and transmits and receives radio signals via the antenna 1737. The radio communication interface 1733 may also be a one chip module which integrates the BB processor 1734 and the RF circuit 1735 thereon. The radio communication interface 1733 may include multiple BB processors 1734 and multiple RF circuits 1735, as illustrated in FIG. 18. Although FIG. 18 illustrates the example in which the radio communication interface 1733 includes multiple BB processors 1734 and multiple RF circuits 1735, the radio communication interface 1733 may also include a single BB processor 1734 or a single RF circuit 1735.

Furthermore, in addition to a cellular communication scheme, the radio communication interface 1733 may support another type of radio communication scheme such as a short-range wireless communication scheme, a near-field communication scheme, and a wireless LAN scheme. In this case, the radio communication interface 1733 may include the BB processor 1734 and the RF circuit 1735 for each radio communication scheme.

Each of the antenna switches 1736 switches the connection destination of the antenna 1737 among multiple circuits (such as circuits for different radio communication schemes) included in the radio communication interface 1733.

Each of the antennas 1737 includes a single or multiple antenna elements, such as multiple antenna elements included in a MIMO antenna, and is used for the radio communication interface 1733 to transmit and receive radio signals. The car navigation device 1720 may include multiple antennas 1737, as illustrated in FIG. 18. Although FIG. 18 illustrates the example in which the car navigation device 1720 includes multiple antennas 1737, the car navigation device 1720 may also include a single antenna 1737.

Furthermore, the car navigation device 1720 may include the antenna 1737 for each radio communication scheme. In this case, the antenna switch 1736 may be omitted from the configuration of the car navigation device 1720.

The battery 1738 supplies power to blocks of the car navigation device 1720 illustrated in FIG. 18 via feeder lines that are partially shown as dashed lines in the figure. Battery 1738 accumulates power supplied from the vehicle.

The technology of the present disclosure may also be realized as an in-vehicle system (or vehicle) 1740 including one or more blocks of the car navigation device 1720, the in-vehicle network 1741, and the vehicle module 1742. The vehicle module 1742 generates vehicle data such as vehicle speed, engine speed, and faults information, and outputs the generated data to the in-vehicle network 1741.

Figure 19:
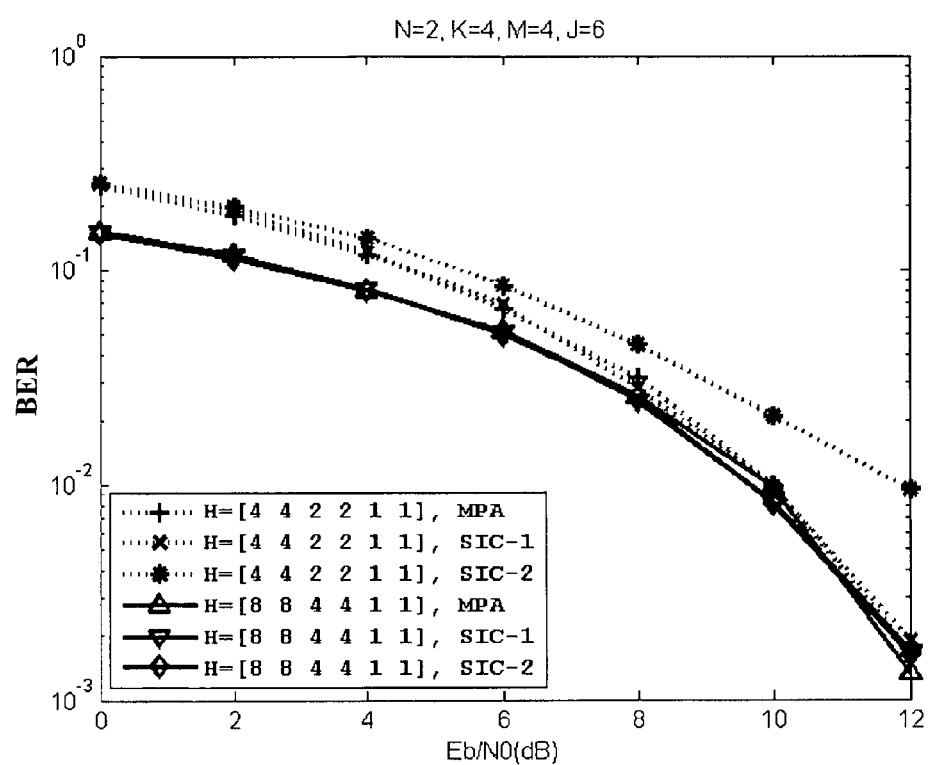
FIG. 19 is a performance analysis diagram of data detection schemes in accordance with an embodiment herein.

Finally, the inventor presents error rate performance simulation results under two channel states H (i.e., two channel gains for two users, H1=[4 4 2 2 1 1] and H2=[8 8 4 4 1 1]) based on the SCMA algorithm (converting 2-dimensional constellation symbols for 6 users into 4-dimensional sparse codewords) and by using the above two data detection schemes of FIG. 5B and FIG. 5C. In FIG. 19, the performance curves of the schemes of FIGS. 5C and 5B are labeled as SIC-1 and SIC-2, respectively, and the performance curve of the original message passing algorithm is labeled as MPA as a comparison. In other words, curve SIC-1 reflects that: the receiving end decodes signals for first two users 1 and 2 from the received signal y, the factor graph matrix at this time is $F_1$, and signals for other users are treated as interferences; after the signals x1 and x2 for the two users 1 and 2 are decoded, the decoded signals are subtracted from the received signal y, and then the MPA decoding is performed on the users 3, 4, 5 and 6, the factor graph matrix at this time is a union set of $F_2$ and $F_3$, thereby the data for the users 3, 4, 5 and 6 are decoded. Curve SIC-2 reflects that: the receiving end decodes signals for first two users 1 and 2 from the received signal y, the factor graph matrix at this time is $F_1$, and signals for other users are treated as interferences; after the signals x1 and x2 for the two users 1 and 2 are decoded, the decoded signals are subtracted from the received signal y, and then decoding is performed on the users 3 and 4, the factor graph matrix at this time is $F_2$, and signals for the last two users are treated as interferences; after the signals x3 and x4 for the users 3 and 4 are decoded, the decoded signals are subtracted, and finally decoding is performed on the users 5 and 6, and the factor graph matrix at this time is $F_3$.

The performance simulation results in FIG. 19 show that as differences between channel gains of users increase, the gap in terms of bit error rate performance between the data detection scheme based on serial interference cancellation and the message passing algorithm gets smaller, that is, the performance loss gets smaller. When the differences between channel gains of the uses is larger (such as H2=[8 8 4 4 1 1]), the loss of SIC-1 in the bit error rate performance is negligible. In addition, from the viewpoint of decoding complexity, there can be SIC-2<SIC-1<MPA. It can be seen that, according to the solution of the present disclosure, at least one of appropriate user grouping, re-grouping, resource reallocation within the group, and data detection scheme update can be performed according to a specific system situation, thereby achieving a compromise of decoding complexity and bit error rate and the multiple access scheme in mode domain is made suitable for practical applications.

Although the illustrative embodiments herein have been described with reference to the accompanying drawings, the present disclosure is certainly not limited to the above examples. Those skilled in the art can achieve various adaptions and modifications within the scope of the appended claims, and it will be appreciated that these adaptions and modifications certainly fall into the scope of the technology of the present disclosure.

For example, in the above embodiments, the multiple functions included in one module can be implemented by separate means. Alternatively, in the above embodiments, the multiple functions included in multiple modules can be implemented by separate means, respectively. In additions, one of the above functions can be implemented by multiple units. Needless to say, such configurations are included in the scope of the technology of the present disclosure.

In this specification, the steps described in the flowcharts include not only the processes performed sequentially in chronological order, but also the processes performed in parallel or separately but not necessarily performed in chronological order. Furthermore, even in the steps performed in chronological order, needless to say, the order can be changed appropriately.

Although the present disclosure and its advantages have been described in detail, it will be appreciated that various changes, replacements and transformations can be made without departing from the spirit and scope of the present disclosure as defined by the appended claims. In addition, the terms "include", "comprise" or any other variants of the embodiments herein are intended to be non-exclusive inclusion, such that the process, method, article or device including a series of elements includes not only these elements, but also those that are not listed specifically, or those that are inherent to the process, method, article or device. In case of further limitations, the element defined by the sentence "include one" does not exclude the presence of additional same elements in the process, method, article or device including this element.

What is claimed is:

1. An electronic device for a wireless communication system, comprising:
   a processing circuit configured for:
   grouping terminal devices for data transmission based on terminal device information, wherein resources are multiplexed by a plurality of data streams for terminal devices in a same group through multiple access in mode domain; and
   based on detection information on the data transmission, performing at least one of: re-grouping the terminal devices, re-allocating resources within respective groups, and updating a data detection scheme,
   wherein the data detection scheme is used for decoding received data based on serial detection algorithms,
   wherein the processing circuit is further configured to determine the data detection scheme, and said determining the data detection scheme comprises: classifying the terminal devices within respective groups into levels, such that at least one level comprises two or more terminal devices, and
   wherein the terminal devices among different levels are detected through the serial detection algorithms, and the two or more terminal devices within a same level are detected through parallel detection algorithms.

2. The electronic device of claim 1, wherein the terminal device information comprises channel state information, and said grouping the terminal devices comprises:
   classifying the terminal devices into groups based on the channel state information, such that differences between channel gains of the terminal devices in a same group are as large as possible or larger than a predetermined threshold,
   wherein said grouping the terminal devices makes the terminal devices in a same group multiplexing a same set of resources, and the terminal devices in different groups using different sets of resources.

3. The electronic device of claim 2, wherein said classifying the terminal devices into the groups comprises at least one of:
   ordering the terminal devices based on the channel gains, and classifying each terminal device into different groups in order; or
   matching the terminal devices into group configuration templates based on the channel gains, wherein each group configuration templates specify a number of the terminal devices within a group and channel gain levels of the terminal devices.

4. The electronic device of claim 2, wherein, for downlink data transmission from a base station to the terminal devices, if the decoding capability of particular terminal devices can support only the serial detection algorithms, said classifying the terminal devices into the groups further comprises classifying the particular terminal devices that can support only the serial detection algorithms into a same group, wherein the terminal devices within the same group are detected only through the serial detection algorithms.

5. The electronic device of claim 1, wherein the processing circuit is further configured to determine resource allocation within respective groups, said resource allocation makes overlaps between resources for the data streams for the terminal devices within a same level as small as possible.

6. The electronic device of claim 1, wherein said classifying the terminal devices within the respective groups into the levels comprises classifying the terminal devices into corresponding levels based on channel gains, and detection orders are more in front for data streams for the terminal devices within the levels corresponding to higher channel gains.

7. The electronic device of claim 6, wherein, for downlink data transmission from a base station to the terminal devices, if the decoding capability of a particular terminal device can support only the serial detection algorithms, said classifying the terminal devices within respective groups into the levels further comprises assigning higher downlink transmission power to the particular terminal device, and classifying the particular terminal device alone into a separate level with a detection order as in front as possible.

8. The electronic device of claim 1, wherein the detection information comprises detection error information, and if the detection error for the data streams does not meet a bit error rate requirement or retransmission rate requirement, at least one of the following is performed:
   re-grouping the terminal devices, to increase differences between the channel gains of the terminal devices within the groups;
   updating the data detection scheme, to adjust detection orders in the serial detection algorithms for data streams for respective terminal devices in the groups;
   updating the data detection scheme, to adjust a number of serial detection levels in the serial detection algorithms;
   re-allocating resources within the groups, to reduce overlaps between resources for data streams for the terminal device with detection order in front and other data streams with detection orders subsequent thereto in the serial detection algorithms; and
   re-allocating resources within the groups, to reduce overlaps between resources for data streams for the terminal devices within a same level of a same group,
   or, wherein the detection information comprises detection error information, and said updating the data detection scheme comprises reducing a number of levels within the groups if a system average detection error does not meet an average bit error rate requirement,
   or, wherein the detection information comprises detection complexity information, and said updating the data detection scheme comprises increasing a number of levels within the groups if a detection complexity is above a detection complexity threshold.

9. The electronic device of claim 1, wherein at least one of said re-grouping the terminal devices, re-allocating resources within respective groups, and updating the data detection scheme based on detection information is performed periodically; and/or performance of at least one of said re-grouping the terminal devices, re-allocating resources within respective groups, and updating the data detection scheme based on the detection information is triggered by events, and the trigger events comprise a detection error does not meet a bit error rate requirement or retransmission rate requirement for a first predetermined duration, and/or a detection complexity is above a detection complexity threshold for a second predetermined duration, or, wherein the processing circuit is further configured to: for uplink data transmission from the terminal devices to a base station, notify the terminal devices of respective results of resource allocation after performing said re-allocating resources.

10. The electronic device of claim 1, wherein the processing circuit is further configured to: for downlink data transmission from a base station to the terminal devices, notify the terminal devices of respective results of the terminal device re-grouping, resource re-allocation and the data detection scheme updating, after performing at least one of said re-grouping the terminal devices, re-allocating resources within respective groups, and updating the data detection scheme, or, wherein the processing circuit is further configured to: for downlink data transmission from a base station to the terminal devices, obtain detection information for the downlink data transmission from the terminal devices, in order to perform at least one of said re-grouping the terminal devices, re-allocating resources within respective groups, and updating the data detection scheme.

11. An electronic device for a wireless communication system, comprising:
a processing circuit configured to:
obtain results of terminal device grouping, the results of the terminal device grouping are determined for data transmission based on terminal device information, wherein resources are multiplexed by a plurality of data streams for the terminal devices in a same group through multiple access in mode domain; and
obtain at least one of results of terminal device re-grouping, results of resource re-allocation, and an updated data detection scheme, wherein the at least one of results of the terminal device re-grouping, results of the resource re-allocation, and the updated data detection scheme is determined based on detection information on the data transmission,
wherein the data detection scheme is used for decoding received data by the electronic device based on serial detection algorithms,
wherein the processing circuit is further configured to obtain the data detection scheme from a base station, determining the data detection scheme by the base station comprises: classifying the terminal devices within respective groups into levels, such that at least one level comprises two or more terminal devices, and
wherein the terminal devices among different levels are detected through the serial detection algorithms, and the two or more terminal devices within a same level are detected through parallel detection algorithms.

12. The electronic device of claim 11, wherein the terminal device information comprises channel state information, and said grouping the terminal devices comprises:

classifying the terminal devices into groups based on the channel state information, such that differences between channel gains of the terminal devices in a same group are as large as possible or larger than a predetermined threshold, wherein said grouping the terminal devices makes the terminal devices in a same group multiplexing a same set of resources, and the terminal devices in different groups using different sets of resources.

13. The electronic device of claim 12, wherein said classifying the terminal devices into the groups comprises at least one of:
ordering the terminal devices based on the channel gains, and classifying each terminal device into different groups in order; and
matching the terminal devices into group configuration templates based on the channel gains, wherein each group configuration template specifies a number of the terminal devices within a group and channel gain levels of the terminal devices.

14. The electronic device of claim 12, wherein if the decoding capability of the electronic device can support only the serial detection algorithms, the electronic device is classified into a group of terminal devices that can support only the serial detection algorithms, wherein the terminal devices within this group are detected only through the serial detection algorithms.

15. The electronic device of claim 11, wherein the processing circuit is further configured to obtain a result of resource allocation within a respective group, and said result of resource allocation makes overlaps between resources for the data streams for the terminal devices within a same level as small as possible, or, wherein said classifying the terminal devices within the respective groups into the levels comprises classifying the terminal devices into corresponding levels based on channel gains, and detection orders are more in front for data streams for the terminal devices within the levels corresponding to higher channel gains.

16. The electronic device of claim 11, wherein if the decoding capability of the electronic device can support only the serial detection algorithms, a higher downlink transmission power is assigned to the electronic device, and the electronic device alone is classified into a separate level with a detection order as in front as possible.

17. The electronic device of claim 11, wherein the detection information comprises detection error information, and if the detection error for the data streams does not meet a bit error rate requirement or retransmission rate requirement, at least one of the following is performed:
re-grouping the terminal devices, to increase differences between the channel gains of the terminal devices within the groups;
updating the data detection scheme, to adjust detection orders in the serial detection algorithms for data streams for respective terminal devices in the groups;
updating the data detection scheme, to adjust a number of serial detection levels in the serial detection algorithms;
re-allocating resources within the groups, to reduce overlaps between resources for data streams for the terminal device with detection order in front and other data streams with detection orders subsequent thereto in the serial detection algorithms; and
re-allocating resources within the groups, to reduce overlaps between resources for data streams for the terminal devices within a same level of a same group.

18. The electronic device of claim 11, wherein the detection information comprises detection error information, and said updating the data detection scheme comprises reducing a number of levels within the groups if a system average detection error does not meet an average bit error rate requirement,
- or, wherein the detection information comprises detection complexity information, and said updating the data detection scheme comprises increasing a number of levels within the groups if a detection complexity is above a detection complexity threshold,
- or, wherein at least one of said re-grouping the terminal devices, re-allocating resources within respective groups, and updating the data detection scheme based on detection information is performed periodically; and/or performance of at least one of said re-grouping the terminal devices, re-allocating resources within respective groups, and updating the data detection scheme based on the detection information is triggered by events, and the trigger events comprise a detection error does not meet a bit error rate requirement or retransmission rate requirement for a first predetermined duration, and/or a detection complexity is above a detection complexity threshold for a second predetermined duration,

- or, wherein the processing circuit is further configured to report detection information to a base station, for the base station to perform at least one of said re-grouping the terminal devices, re-allocating resources within respective groups, and the updated data detection scheme.

* * * * *